(12) United States Patent  
Ohkawa

(10) Patent No.: US 9,170,363 B2  
(45) Date of Patent: *Oct. 27, 2015

(54) LIGHT-EMITTING DEVICE AND IMAGE DISPLAY APPARATUS

(71) Applicant: Sony Corporation, Tokyo (JP)

(72) Inventor: Shingo Ohkawa, Saitama (JP)

(73) Assignee: Sony Corporation (JP)

( * ) Notice: Subject to any disclaimer, the term of this patent is extended or adjusted under 35 U.S.C. 154(b) by 34 days.

This patent is subject to a terminal disclaimer.

(21) Appl. No.: 14/076,356

(22) Filed: Nov. 11, 2013

(65) Prior Publication Data

US 2014/0063842 A1 Mar. 6, 2014

Related U.S. Application Data

(63) Continuation of application No. 13/245,937, filed on Sep. 27, 2011, now Pat. No. 8,602,630.

(30) Foreign Application Priority Data

Oct. 7, 2010 (JP) ................................ P2010-227410

(51) Int. Cl.
*F21V 7/04* (2006.01)
*F21V 8/00* (2006.01)
*G02F 1/1335* (2006.01)

(52) U.S. Cl.
CPC ............ *G02B 6/0055* (2013.01); *G02B 6/0038* (2013.01); *G02F 1/1336* (2013.01); *G02F 1/133615* (2013.01); *G02F 1/133606* (2013.01); *G02F 2001/133607* (2013.01)

(58) Field of Classification Search
CPC ....... G02B 6/0038; G02B 6/0036; F21V 5/02
USPC ............................ 362/612, 619, 330; 359/619
See application file for complete search history.

(56) References Cited

U.S. PATENT DOCUMENTS 7,081,933 B2 7/2006 Yu et al.
7,230,603 B2 6/2007 Yamamoto et al.
(Continued)

FOREIGN PATENT DOCUMENTS

CN 1612011 A 5/2005
JP 9061631 3/1997
(Continued)

OTHER PUBLICATIONS

Office Action from Chinese Application No. 2011-10299522.2, dated Jul. 24, 2014.
(Continued)

*Primary Examiner* — Peggy Neils
(74) *Attorney, Agent, or Firm* — Lerner, David, Littenberg, Krumholz & Mentlik, LLP

(57) ABSTRACT

A light-emitting device includes: a light guiding member; a plurality of light-emitting elements; and a reflection member. A light reflection/exit surface of the light guiding member has a concave-convex pattern including a plurality of convex portions reflecting light emitted from the light-emitting elements inward. On the assumption that L is a distance between the light-emitting elements, t is a thickness of the light guiding member, an incident angle φ of the light on the light reflection/exit surface is an angle between a line segment obtained by projecting a light path from the light-emitting element to the light reflection/exit surface and a line segment extending from a central point of the light-emitting element to the light reflection/exit surface, and θ is a maximum angle range of reflected light, a value of the angle range θ decreases as a value of the incident angle φ increases in a range of 0<φ<tan−1 (L/t).

6 Claims, 34 Drawing Sheets

(56) References Cited

U.S. PATENT DOCUMENTS

| | | |
|---|---|---|
| 7,344,282 B2 | 3/2008 | Kim et al. |
| 7,635,200 B2 * | 12/2009 | Atsushi ............ 362/244 |
| 7,744,235 B2 * | 6/2010 | Horikoshi et al. ........ 362/97.4 |
| 7,845,840 B2 | 12/2010 | Fang et al. |
| 8,052,319 B2 | 11/2011 | Lee et al. |
| 8,303,154 B2 * | 11/2012 | Ha et al. ............ 362/619 |
| 2009/0201665 A1 * | 8/2009 | Goto ............ 362/97.1 |

FOREIGN PATENT DOCUMENTS

| | | |
|---|---|---|
| JP | 11052380 | 2/1999 |
| JP | 2004152515 A | 5/2004 |
| JP | 2005259361 A | 9/2005 |
| JP | 2006154292 A | 6/2006 |
| JP | 2009500663 A | 1/2009 |
| JP | 2009087887 A | 4/2009 |
| JP | 2009110783 A | 5/2009 |
| JP | 2009-199926 A | 9/2009 |
| JP | 2009301805 A | 12/2009 |
| JP | 2010205713 A | 9/2010 |
| WO | 2010058845 A1 | 5/2010 |

OTHER PUBLICATIONS

Office Action from Japanese Application No. 2010-227410, date Aug. 5, 2014.
Japanese Office Action for JP Application No. 20144245169, dated Aug. 25, 2015.

* cited by examiner

LIGHT-EMITTING DEVICE AND IMAGE DISPLAY APPARATUS

CROSS-REFERENCE TO RELATED APPLICATION

The present application is a continuation of U.S. patent application Ser. No. 13/245,937, filed on Sep. 27, 2011, which claims priority from Japanese Patent Application No. JP 2010-227410 filed in the Japanese Patent Office on Oct. 7, 2010, all of which are incorporated herein by reference.

BACKGROUND

The present disclosure relates to a light-emitting device and an image display apparatus, and more particularly, to a light-emitting device and an image display apparatus capable of improving the uniformity of a luminance to reduce unevenness of the luminance and reducing leakage light in such manner that a concave-convex pattern formed by a plurality of convex portions formed in a light-exiting surface of a light guiding member satisfies a predetermined condition.

There is a light-emitting device performing illumination using a light source such as a light-emitting diode (LED). For example, the light-emitting device is used as an illumination device by using the light source directly as an illumination or is used for an image display apparatus such as a television receiver or a personal computer by using the light source as a backlight illumination.

An example of the image display apparatus includes a liquid crystal display apparatus in which a liquid crystal panel is used as a display panel displaying an image.

In the liquid crystal apparatus, since the liquid crystal panel is not a self light-emitting display, a light-emitting device including a light source which emits light from a rear surface side to the liquid crystal panel is disposed. Accordingly, the light-emitting device is used as a backlight device which emits light toward the liquid crystal panel from the rear surface side.

As the light-emitting device used as the backlight device, there is a so-called side edge type light-emitting device which includes a light guiding member and in which a light source is disposed on the side of the light guiding member and light emitted from the light source is guided in a predetermined direction by the light guiding member to be emitted toward a display panel. Further, as the light-emitting device used as the backlight device, there is a so-called straight-down type light-emitting device in which the light source is disposed on the rear surface side of the display panel and light emitted from the light source is emitted toward the display panel.

In the side edge type light-emitting device, since a plurality of light sources is disposed on the side of the light guiding member, the image display apparatus can be made thin.

In the side edge type light-emitting device, it is preferable that light does not exit and does not leak in a region determined in advance in each light source of the light guiding member, that is, a region located on the side of each light source toward an adjacent region, when the light is emitted from each of the plurality of light source. In particular, in a light-emitting device called a so-called scan backlight which emits light sequentially respective strip-shaped regions and improves the definition of an image, there is a high necessity to reduce leakage light to the adjacent region.

By reducing the leakage light, it is possible to suppress the deterioration in light use efficiency or partial deterioration in luminance.

There is a light-emitting device according to the related art, in which a plurality of groove portions is formed at a predetermined interval on the surface of a light guiding member (for example, Japanese Unexamined Patent Application Publication No. 2009-199926).

The light-emitting device disclosed in Japanese Unexamined Patent Application Publication No. 2009-199926 attempts to suppress light from travelling toward the adjacent region by the groove portions and reduce the leakage light to the adjacent region.

SUMMARY

In the light-emitting device disclosed in Japanese Unexamined Patent Application Publication No. 2009-199926, the leakage light to the adjacent region is reduced by the groove portions. However, a problem may arise in that the amount of emitted light in a portion near a light-emitting element is considerably different from that in another portion, thereby deteriorating the unevenness of luminance.

On the contrary, when the number of groove portions is reduced to prevent the deterioration in the unevenness of the luminance, a problem may arise in that the leakage light to the adjacent region increases.

It is desirable to provide a light-emitting device and an image display apparatus capable of improving uniformity of the luminance by reducing the unevenness of the luminance and reducing the leakage light.

According to an embodiment of the disclosure, there is provided a light-emitting device including: a plate-shaped light guiding member of which one surface in a thickness direction of the light guiding member is formed as a light reflection/exit surface reflecting light inward and exiting the light and of which both side surfaces facing each other in a direction perpendicular to the thickness direction are each formed as a light-incident surface on which the light is incident; a plurality of light-emitting elements which is disposed on the light-incident surfaces of the light guiding member so as to face each other and is spaced in a first reaction perpendicular to the thickness direction; and a reflection member which is disposed so as to face an opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has a concave-convex pattern including a plurality of convex portions which is continuously formed in the first direction on the light reflection/exit surface of the light guiding member, extends in a second direction perpendicular to the thickness direction and the first direction, and reflects the light emitted from the light-emitting elements inward. On the assumption that L is a distance between the light-emitting elements, t is a thickness of the light guiding member, an incident angle $\phi$ of the light on the light reflection/exit surface is an angle between a line segment, which is obtained by projecting a light path from the light-emitting element to the light reflection/exit surface on a surface parallel to the light-incident surface, and a line segment, which extends from a central point of the light-emitting element to the light reflection/exit surface in the thickness direction, $\theta$ is a maximum angle range of reflected light when light incident at the incident angle $\phi$ is reflected inward from the light reflection/exit surface, and ranges close to and distant from the light-emitting element emitting the light with respect to a line segment extending in the thickness direction in the angle range $\theta$ are negative and positive ranges, respectively, a value of the angle range θ decreases as a value of the incident angle φ increases in a range of 0<φ<tan$^{-1}$ (L/t) and the angle range θ covers both of the positive and negative ranges.

Accordingly, in the light-emitting device, the angle range θ covers both of the positive and negative ranges when the light is incident on the light reflection/exit surface at the incident angle φ and is reflected inward in the range of 0<φ<tan$^{-1}$ (L/t).

In the light-emitting device, on the assumption that, in a cross-sectional shape parallel to the light-incident surface, an X axis is a line segment binding both ends of the convex portion in the first direction, a Y axis is a line segment passing through a central point of the both ends of the convex portion and extending in the thickness direction, and a is a maximum height of the convex portion, an outer shape of the convex portion may satisfy an equation of $Y=-X^2/4a+a$.

When the outer shape of the convex portion satisfies the equation of $Y=-X^2/4a+a$, the light passing through the focus of the convex portion and reflected inward travels in the thickness direction of the light guiding member.

According to another embodiment of the disclosure, there is provided a light-emitting device including: a plate-shaped light guiding member of which one surface in a thickness direction of the light guiding member is formed as a light reflection/exit surface reflecting light inward and exiting the light and of which both side surfaces facing each other in a direction perpendicular to the thickness direction are each formed as a light-incident surface on which the light is incident; a plurality of light-emitting elements which is disposed on the light-incident surfaces of the light guiding member so as to face each other and is spaced in a first reaction perpendicular to the thickness direction; and a reflection member which is disposed so as to face an opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has a concave-convex pattern including a plurality of convex portions which is continuously formed in the first direction on the light reflection/exit surface of the light guiding member, extends in a second direction perpendicular to the thickness direction and the first direction, and reflects the light emitted from the light-emitting elements inward. On the assumption that L is a distance between the light-emitting elements, t is a thickness of the light guiding member, an incident angle φ of the light on the light reflection/exit surface is an angle between a line segment, which is obtained by projecting a light path from the light-emitting element to the light reflection/exit surface on a surface parallel to the light-incident surface, and a line segment, which extends from a central point of the light-emitting element to the light reflection/exit surface in the thickness direction, θ is a maximum angle range of reflected light when light incident at the incident angle φ is reflected inward from the light reflection/exit surface, and ranges close to and distant from the light-emitting element emitting the light with respect to a line segment extending in the thickness direction in the angle range θ are negative and positive ranges, respectively, a value of the angle range θ decreases as a value of the incident angle φ increases in a range of 0<φ<tan$^{-1}$ (L/t) in a range up to a distance L2 in the second direction from the both side surfaces of the light guiding member and the angle range θ covers both of the positive and negative ranges, whereas the value of the angle range θ decreases as the value of the incident angle φ increases in the range of 0<φ<tan$^{-1}$ (L/t) in a range distant from the distance L2 in the second direction from the both side surfaces of the light guiding member and the angle range θ covers only the negative range in a case of φ=tan$^{-1}$(L/t), where L2>L/[ tan { sin$^{-1}$(1/n)}] on the assumption that n is a refractive index of the light guiding member.

Accordingly, in the light-emitting device according to another embodiment of the disclosure, the angle range θ covers both of the positive and negative ranges when the light is incident on the light reflection/exit surface at the incident angle φ and is reflected inward in the range of 0<φ<tan$^{-1}$ (L/t).

In the light-emitting device according to another embodiment of the disclosure, on the assumption that, in a cross-sectional shape parallel to the light-incident surface, an X axis is a line segment binding both ends of the convex portion in the first direction, a Y axis is a line segment passing through a central point of the both ends of the convex portion and extending in the thickness direction, and a is a maximum height of the convex portion, an outer shape of the convex portion may satisfy the equation of $Y=-X^2/4a+a$.

When the outer shape of the convex portion satisfies the equation of $Y=-X^2/4a+a$, the light passing through the focus of the convex portion and reflected inward travels in the thickness direction of the light guiding member.

According to still another embodiment of the disclosure, there is provided an image display apparatus including: a display panel which displays an image; a plate-shaped light guiding member which is disposed opposite to a display surface of the display panel, of which one surface in a thickness direction of the light guiding member is formed as a light reflection/exit surface reflecting light inward and exiting the light, and of which both side surfaces facing each other in a direction perpendicular to the thickness direction are each formed as a light-incident surface on which the light is incident; a plurality of light-emitting elements which is disposed on the light-incident surfaces of the light guiding member so as to face each other and is spaced in a first reaction perpendicular to the thickness direction; and a reflection member which is disposed so as to face an opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has a concave-convex pattern including a plurality of convex portions which is continuously formed in the first direction on the light reflection/exit surface of the light guiding member, extends in a second direction perpendicular to the thickness direction and the first direction, and reflects the light emitted from the light-emitting elements inward. On the assumption that L is a distance between the light-emitting elements, t is a thickness of the light guiding member, an incident angle φ of the light on the light reflection/exit surface is an angle between a line segment, which is obtained by projecting a light path from the light-emitting element to the light reflection/exit surface on a surface parallel to the light-incident surface, and a line segment, which extends from a central point of the light-emitting element to the light reflection/exit surface in the thickness direction, θ is a maximum angle range of reflected light when light incident at the incident angle φ is reflected inward from the light reflection/exit surface, and ranges close to and distant from the light-emitting element emitting the light with respect to a line segment extending in the thickness direction in the angle range θ are negative and positive ranges, respectively, a value of the angle range θ decreases as a value of the incident angle φ increases in a range of 0<φ<tan$^{-1}$ (L/t) and the angle range θ covers both of the positive and negative ranges.

Accordingly, in the image display apparatus, the angle range θ covers both of the positive and negative ranges when the light is incident on the light reflection/exit surface at the incident angle $\phi$ and is reflected inward in the range $0<\phi<\tan^{-1}(L/t)$.

According to further still another embodiment of the disclosure, there is provided an image display apparatus including: a display panel which displays an image; a plate-shaped light guiding member which is disposed opposite to a display surface of the display panel, of which one surface in a thickness direction of the light guiding member is formed as a light reflection/exit surface reflecting light inward and exiting the light, and of which both side surfaces facing each other in a direction perpendicular to the thickness direction are each formed as a light-incident surface on which the light is incident; a plurality of light-emitting elements which is disposed on the light-incident surfaces of the light guiding member so as to face each other and is spaced in a first reaction perpendicular to the thickness direction; and a reflection member which is disposed so as to face an opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has a concave-convex pattern including a plurality of convex portions which is continuously formed in the first direction on the light reflection/exit surface of the light guiding member, extends in a second direction perpendicular to the thickness direction and the first direction, and reflects the light emitted from the light-emitting elements inward. On the assumption that L is a distance between the light-emitting elements, t is a thickness of the light guiding member, an incident angle $\phi$ of the light on the light reflection/exit surface is an angle between a line segment, which is obtained by projecting a light path from the light-emitting element to the light reflection/exit surface on a surface parallel to the light-incident surface, and a line segment, which extends from a central point of the light-emitting element to the light reflection/exit surface in the thickness direction, $\theta$ is a maximum angle range of reflected light when light incident at the incident angle $\phi$ is reflected inward from the light reflection/exit surface, and ranges close to and distant from the light-emitting element emitting the light with respect to a line segment extending in the thickness direction in the angle range $\theta$ are negative and positive ranges, respectively, a value of the angle range $\theta$ decreases as a value of the incident angle $\phi$ increases in a range of $0<\phi<\tan^{-1}(L/t)$ in a range up to a distance L2 in the second direction from the both side surfaces of the light guiding member and the angle range $\theta$ covers both of the positive and negative ranges, whereas the value of the angle range $\theta$ decreases as the value of the incident angle $\phi$ increases in the range of $0<\phi<\tan^{-1}(L/t)$ in a range distant from the distance L2 in the second direction from the both side surfaces of the light guiding member and the angle range $\theta$ covers only the negative range in a case of $\phi=\tan^{-1}(L/t)$, where $L2>L/[\tan\{\sin^{-1}(1/n)\}]$ on the assumption that n is a refractive index of the light guiding member.

Accordingly, in the image display apparatus according to further still another embodiment of the disclosure, the angle range $\theta$ covers both of the positive and negative ranges when the light is incident on the light reflection/exit surface at the incident angle $\phi$ and is reflected inward in the range of $0<\phi<\tan^{-1}(L/t)$.

The light-emitting device includes: the plate-shaped light guiding member of which one surface in the thickness direction of the light guiding member is formed as the light reflection/exit surface reflecting light inward and exiting the light and of which both side surfaces facing each other in the direction perpendicular to the thickness direction are each formed as the light-incident surface on which the light is incident; a plurality of light-emitting elements which is disposed on the light-incident surfaces of the light guiding member so as to face each other and is spaced in the first reaction perpendicular to the thickness direction; and the reflection member which is disposed so as to face the opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has the concave-convex pattern including the plurality of convex portions which is continuously formed in the first direction on the light reflection/exit surface of the light guiding member, extends in the second direction perpendicular to the thickness direction and the first direction, and reflects the light emitted from the light-emitting elements inward. The assumption that L is the distance between the light-emitting elements, t is the thickness of the light guiding member, the incident angle $\phi$ of the light on the light reflection/exit surface is the angle between the line segment, which is obtained by projecting the light path from the light-emitting element to the light reflection/exit surface on the surface parallel to the light-incident surface, and the line segment, which extends from the central point of the light-emitting element to the light reflection/exit surface in the thickness direction, $\theta$ is the maximum angle range of the reflected light when the light incident at the incident angle $\phi$ is reflected inward from the light reflection/exit surface, and the ranges close to and distant from the light-emitting element emitting the light with respect to the line segment extending in the thickness direction in the angle range $\theta$ are the negative and positive ranges, respectively, the value of the angle range $\theta$ decreases as the value of the incident angle $\phi$ increases in the range of $0<\phi<\tan^{-1}(L/t)$ and the angle range $\theta$ covers both of the positive and negative ranges.

Accordingly, the unevenness of the luminance is reduced in the light guiding member and the uniformity of the luminance is improved. Further, the leakage light in the other division regions is reduced.

In the light-emitting device according to the embodiment of the disclosure, on the assumption that, in the cross-sectional shape parallel to the light-incident surface, the X axis is the line segment binding both ends of the convex portion in the first direction, the Y axis is the line segment passing through the central point of the both ends of the convex portion and extending in the thickness direction, and a is the maximum height of the convex portion, the outer shape of the convex portion satisfies the equation of $Y=-X^2/4a+a$.

Accordingly, the unevenness of the luminance is further reduced and the leakage light in the other division regions is further reduced.

The light-emitting device according to another embodiment of disclosure includes: the plate-shaped light guiding member of which one surface in the thickness direction of the light guiding member is formed as the light reflection/exit surface reflecting light inward and exiting the light and of which both side surfaces facing each other in the direction perpendicular to the thickness direction are each formed as the light-incident surface on which the light is incident; the plurality of light-emitting elements which is disposed on the light-incident surfaces of the light guiding member so as to face each other and is spaced in the first reaction perpendicular to the thickness direction; and the reflection member which is disposed so as to face the opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has the concave-convex pattern including the plurality of convex portions which is continuously formed in the first direction on the light reflection/exit surface of the light guiding member, extends in the second direction perpendicular to the thickness direction and the first direction, and reflects the light emitted from the light-emitting elements inward. On the assumption that L is the distance between the light-emitting elements, t is the thickness of the light guiding member, the incident angle $\phi$ of the light on the light reflection/exit surface is the angle between a line segment, which is obtained by projecting the light path from the light-emitting element to the light reflection/exit surface on the surface parallel to the light-incident surface, and the line segment, which extends from the central point of the light-emitting element to the light reflection/exit surface in the thickness direction, $\theta$ is the maximum angle range of the reflected light when the light incident at the incident angle $\phi$ is reflected inward from the light reflection/exit surface, and the ranges close to and distant from the light-emitting element emitting the light with respect to the line segment extending in the thickness direction in the angle range $\theta$ are the negative and positive ranges, respectively, the value of the angle range $\theta$ decreases as the value of the incident angle $\phi$ increases in the range of $0<\phi<\tan^{-1}(L/t)$ in the range up to the distance L2 in the second direction from the both side surfaces of the light guiding member and the angle range $\theta$ covers both of the positive and negative ranges, whereas the value of the angle range $\theta$ decreases as the value of the incident angle $\phi$ increases in the range of $0<\phi<\tan^{-1}(L/t)$ in the range distant from the distance L2 in the second direction from the both side surfaces of the light guiding member and the angle range $\theta$ covers only the negative range in the case of $\phi=\tan^{-1}(L/t)$, where $L2>L/[\tan\{\sin^{-1}(1/n)\}]$ on the assumption that n is the refractive index of the light guiding member.

Accordingly, even when the shape of the concave-convex pattern is changed, the unevenness of the luminance is reduced in the light guiding member and the uniformity of the luminance is improved. Further, the leakage light in the other division regions is reduced. Furthermore, the degree of freedom is improved in the design of the concave-convex pattern.

In the light-emitting device according to another embodiment of the disclosure, on the assumption that, in a cross-sectional shape parallel to the light-incident surface, an X axis is a line segment binding both ends of the convex portion in the first direction, a Y axis is a line segment passing through a central point of the both ends of the convex portion and extending in the thickness direction, and a is a maximum height of the convex portion, an outer shape of the convex portion satisfies an equation of $Y=-X^2/4a+a$.

Accordingly, the unevenness of the luminance is further reduced and the leakage light in the other division regions is further reduced.

The image display apparatus according to still another embodiment of the disclosure includes: a display panel which displays an image; the plate-shaped light guiding member which is disposed opposite to the display surface of the display panel, of which one surface in a thickness direction of the light guiding member is formed as the light reflection/exit surface reflecting light inward and exiting the light, and of which both side surfaces facing each other in the direction perpendicular to the thickness direction are each formed as the light-incident surface on which the light is incident; the plurality of light-emitting elements which is disposed on the light-incident surfaces of the light guiding member so as to face each other and is spaced in the first reaction perpendicular to the thickness direction; and the reflection member which is disposed so as to face the opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has the concave-convex pattern including the plurality of convex portions which is continuously formed in the first direction on the light reflection/exit surface of the light guiding member, extends in the second direction perpendicular to the thickness direction and the first direction, and reflects the light emitted from the light-emitting elements inward. On the assumption that L is the distance between the light-emitting elements, t is the thickness of the light guiding member, the incident angle $\phi$ of the light on the light reflection/exit surface is the angle between a line segment, which is obtained by projecting the light path from the light-emitting element to the light reflection/exit surface on the surface parallel to the light-incident surface, and the line segment, which extends from the central point of the light-emitting element to the light reflection/exit surface in the thickness direction, $\theta$ is the maximum angle range of the reflected light when the light incident at the incident angle $\phi$ is reflected inward from the light reflection/exit surface, and the ranges close to and distant from the light-emitting element emitting the light with respect to the line segment extending in the thickness direction in the angle range $\theta$ are negative and positive ranges, respectively, the value of the angle range $\theta$ decreases as the value of the incident angle $\phi$ increases in the range of $0<\phi<\tan^{-1}(L/t)$ and the angle range $\theta$ covers both of the positive and negative ranges.

Accordingly, the unevenness of the luminance is further reduced and the leakage light in the other division regions is further reduced.

The image display apparatus according to further still another embodiment of the disclosure includes: the display panel which displays an image; the plate-shaped light guiding member which is disposed opposite to the display surface of the display panel, of which one surface in the thickness direction of the light guiding member is formed as the light reflection/exit surface reflecting light inward and exiting the light, and of which both side surfaces facing each other in the direction perpendicular to the thickness direction are each formed as the light-incident surface on which the light is incident; the plurality of light-emitting elements which is disposed on the light-incident surfaces of the light guiding member so as to face each other and is spaced in the first reaction perpendicular to the thickness direction; and the reflection member which is disposed so as to face the opposite surface of the light reflection/exit surface of the light guiding member and which reflects the light reflected inward from the light reflection/exit surface and passing through the light guiding member and makes the light incident from the opposite surface to the light guiding member. The light reflection/exit surface of the light guiding member has the concave-convex pattern including the plurality of convex portions which is continuously formed in the first direction on the light reflection/exit surface of the light guiding member, extends in the second direction perpendicular to the thickness direction and the first direction, and reflects the light emitted from the light-emitting elements inward. On the assumption that L is the distance between the light-emitting elements, t is the thickness of the light guiding member, the incident angle $\phi$ of the light on the light reflection/exit surface is the angle between a line segment, which is obtained by projecting the light path from the light-emitting element to the light reflection/exit surface on the surface parallel to the light-incident surface, and the line segment, which extends from the central point of the light-emitting element to the light reflection/exit surface in the thickness direction, θ is the maximum angle range of the reflected light when the light incident at the incident angle φ is reflected inward from the light reflection/exit surface, and the ranges close to and distant from the light-emitting element emitting the light with respect to the line segment extending in the thickness direction in the angle range θ are the negative and positive ranges, respectively, the value of the angle range θ decreases as the value of the incident angle φ increases in the range of $0<\phi<\tan^{-1}$ (L/t) in the range up to a distance L2 in the second direction from the both side surfaces of the light guiding member and the angle range θ covers both of the positive and negative ranges, whereas the value of the angle range θ decreases as the value of the incident angle φ increases in the range of $0<\phi<\tan^{-1}$ (L/t) in the range distant from the distance L2 in the second direction from the both side surfaces of the light guiding member and the angle range θ covers only the negative range in the case of $\phi=\tan^{-1}$ (L/t), where $L2>L/[\tan\{\sin^{-1}(1/n)\}]$ on the assumption that n is the refractive index of the light guiding member.

Accordingly, even when the shape of the concave-convex pattern is changed, the unevenness of the luminance is reduced in the light guiding member and the uniformity of the luminance is improved. Further, the leakage light in the other division regions is reduced. Furthermore, the degree of freedom is improved in the design of the concave-convex pattern.

DETAILED DESCRIPTION OF EMBODIMENTS

Hereinafter, a light-emitting device and an image display apparatus according to a preferred embodiment of the disclosure will be described with reference to the accompanying drawings.

In the preferred embodiment described below, the image display apparatus is applied to a television receiver that displays an image on a liquid crystal panel. The light-emitting device is applied to the light-emitting apparatus included in the television receiver.

The application range of the disclosure is not limited to the television receiver including a liquid crystal panel and a light-emitting device included in the television receiver, but can be widely applied to various types of television receivers, image display apparatuses used for a personal computer, and various types of light-emitting devices used for the television receiver and image display apparatuses.

Configuration of Image Display Apparatus

Figure 1:
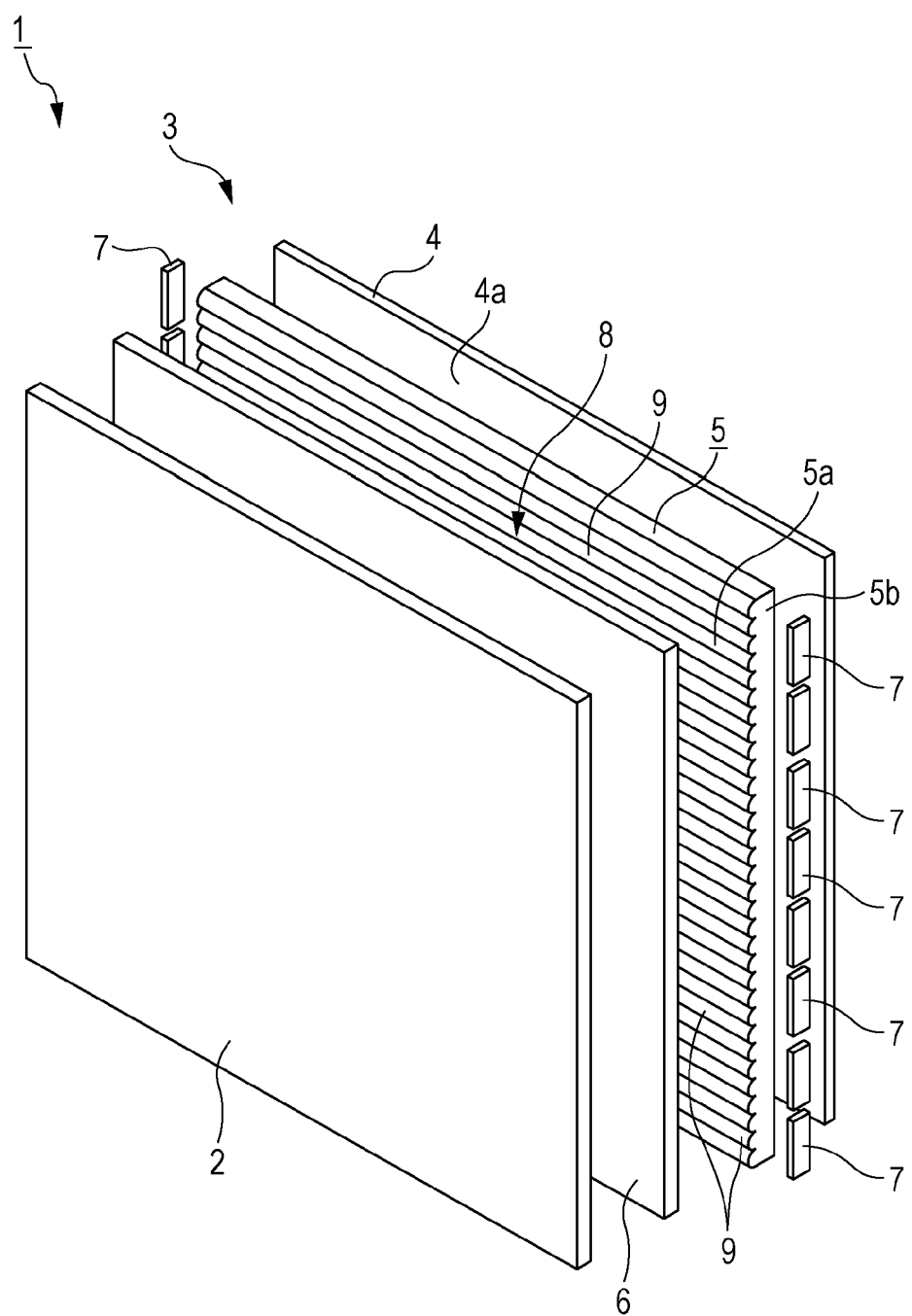
FIG. 1 is an exploded perspective view illustrating an embodiment of an image display apparatus.

An image display apparatus (television receiver) 1 includes necessary units inside an outer chassis (not shown) (see FIG. 1).

The outer chassis has a box-like shape which is horizontally flat and is opened in the front direction and a display panel (liquid crystal panel) 2 that displays an image is disposed at the position at which the opening is blocked from the inside. For example, the display panel 2 includes, for example, a transmission type color liquid crystal panel interposed between two polarizing plates from the front and rear sides and displays a full color image in an active matrix driving method.

Configuration of Light-Emitting Device

A light-emitting device 3 is disposed inside the outer chassis (see FIGS. 1 to 4). The light-emitting device 3 includes a reflection member 4, a light guiding member 5, an optical sheet 6, and light source units 7. The reflection member 4, the light guiding member 5, and the optical sheet 6 are disposed in the order from the rear side. The optical sheet 6 is disposed so as to face the display panel 2. The light source units 7 are disposed on the sides of the light guiding member 5 so as to face the both right and left side surfaces of the light guiding member 5.

The reflection member 4 is formed in a plate shape formed of a resin or a metal colored with, for example, a white or silver color. The reflection member 4 is formed so that the front surface serves as a reflection surface 4a.

The light guiding member 5 is formed in, for example, a rectangular thin plate shape and is disposed between the reflection member 4 and the optical sheet 6. The light guiding member 5 is formed of, for example a transparent material such as acrylic, polycarbonate, polystyrene, or glass.

The light guiding member 5 has a function of guiding light emitted from the light source units 7 in a predetermined direction to make the light incident on the optical sheet 6 and allowing a light flux amount of light emitted from the optical sheet 6 to the display panel 2 to be uniform.

In the light guiding member 5, the front surface, that is, one surface in the thickness direction is formed as a light reflection/exit surface 5a which reflects the light inward and exits the light and the both right and left side surfaces are formed as light-incident surfaces 5b on which the light exiting from the respective light source units 7 is incident. The rear surface of the light guiding member 5, that is, the other surface in the thickness direction serves as a light control surface 5c which transmits the light and reflects the light inward. The light control surface 5c of the light guiding member 5 is subjected to predetermined treatment or processing to reflect light inward, so that some of the light is reflected inward and the light which is not reflected passes toward the rear side. The light passing toward the rear side from the light control surface 5c is reflected from the reflection surface 4a of the reflection member 4 and is incident again on the inside of the light guiding member 5 from the light control surface 5c.

A vertical direction is assumed to be a first direction and a horizontal direction is assumed to be a second direction between two direction perpendicular to each other in the thickness direction (front and rear directions) of the light guiding member 5.

A concave-convex pattern 8 is formed on the light reflection/exit surface 5a of the light guiding member 5. In the concave-convex pattern 8, convex portions 9 which protrude toward the front side and extend in the horizontal direction, which is the second direction, are continuously formed in the vertical direction, which is the first direction. The concave-convex pattern 8 has a function of guiding the light toward the reflection member 4 by inward reflecting the light exiting from the light source units 7 and incident on the light guiding member 5.

Figure 5:
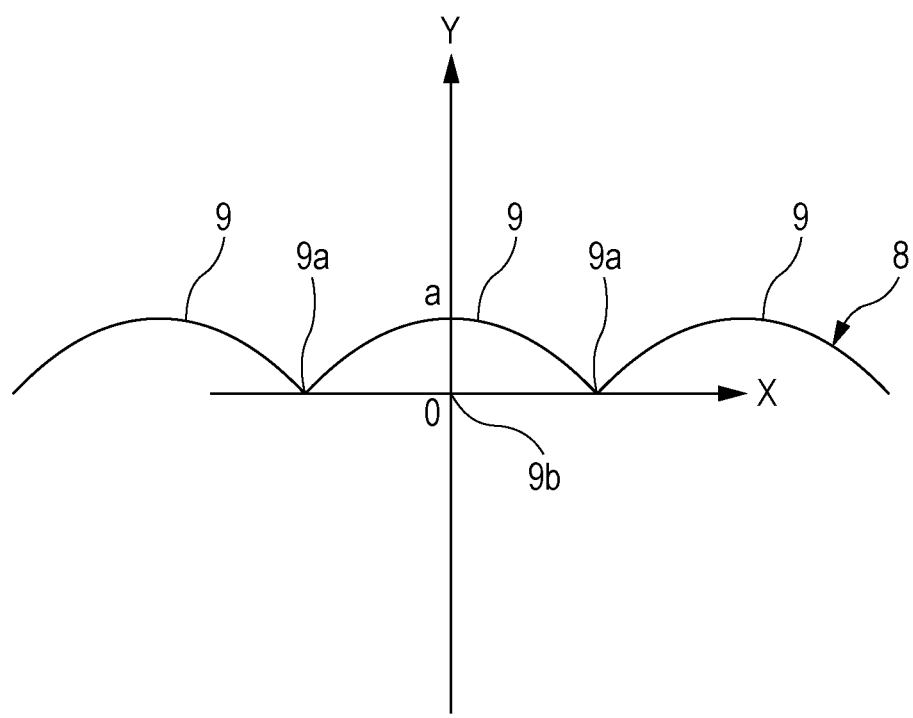
FIG. 5 is a conceptual diagram illustrating the shape of a concave-convex pattern.

In the convex portion 9, its cross-section surface parallel to the light-incident surface 5b is formed in, for example, a parabolic shape (see FIG. 5). That is, a line segment binding both ends 9a of the convex portion 9 in the first direction is assumed to be an X axis in the first direction and a line segment passing a central point 9b of the both ends 9a of the convex portion 9 and extending in the thickness direction is assumed to be a Y axis. On the assumption that a is the maximum height (height from the X axis) of the convex portion 9, the outer shape of the convex portion 9 meets an equation of "$Y=-X^2/4a+a$."

The optical sheet 6 is disposed between the light guiding member 5 and the display panel 2 and, for example, has a function of diffusing the light exiting from the light reflection/exit surface 5a of the light guiding member 5. In regard to the optical sheet 6, sufficient diffusivity is necessary to resolve directivity of the light exiting from the light guiding member 5 and absorption of light is necessary to be low.

Figure 2:
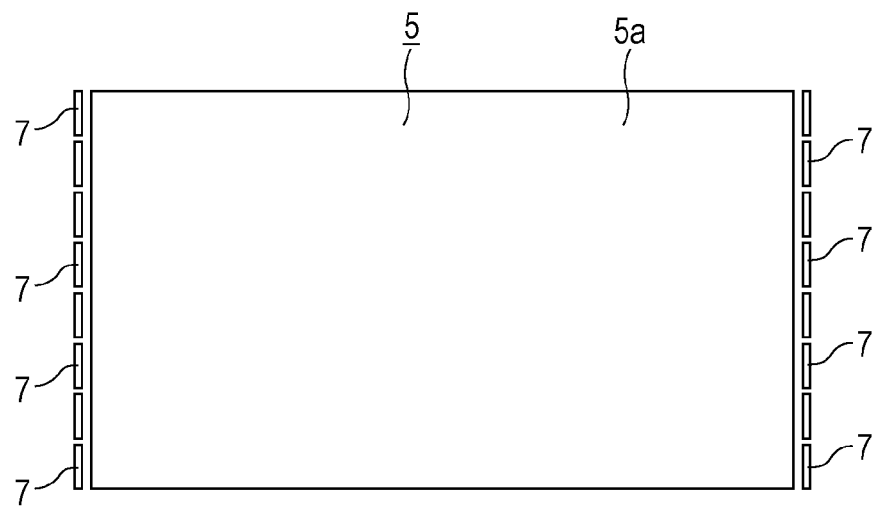
FIG. 2 is a front view illustrating a light guiding member and light source units.
Figure 3:
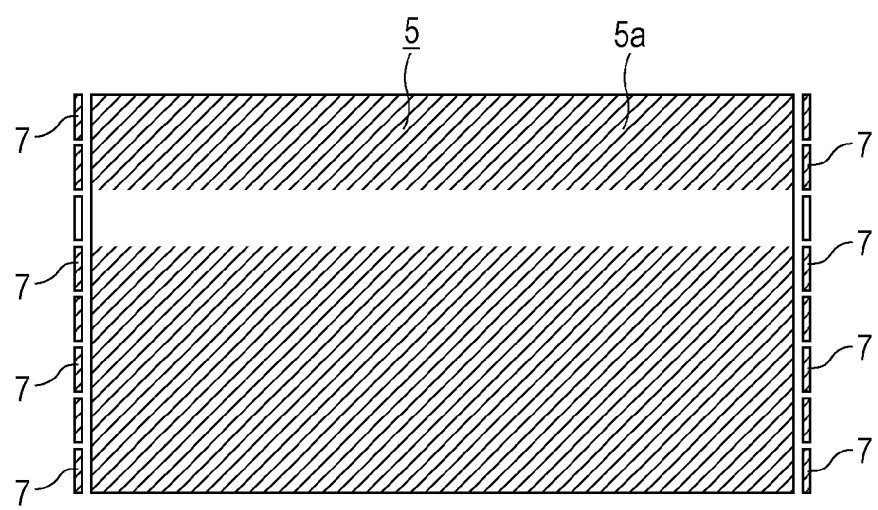
FIG. 3 is a front view illustrating a state where light exits in one division region in the light guiding member and the light source unit.
Figure 4:
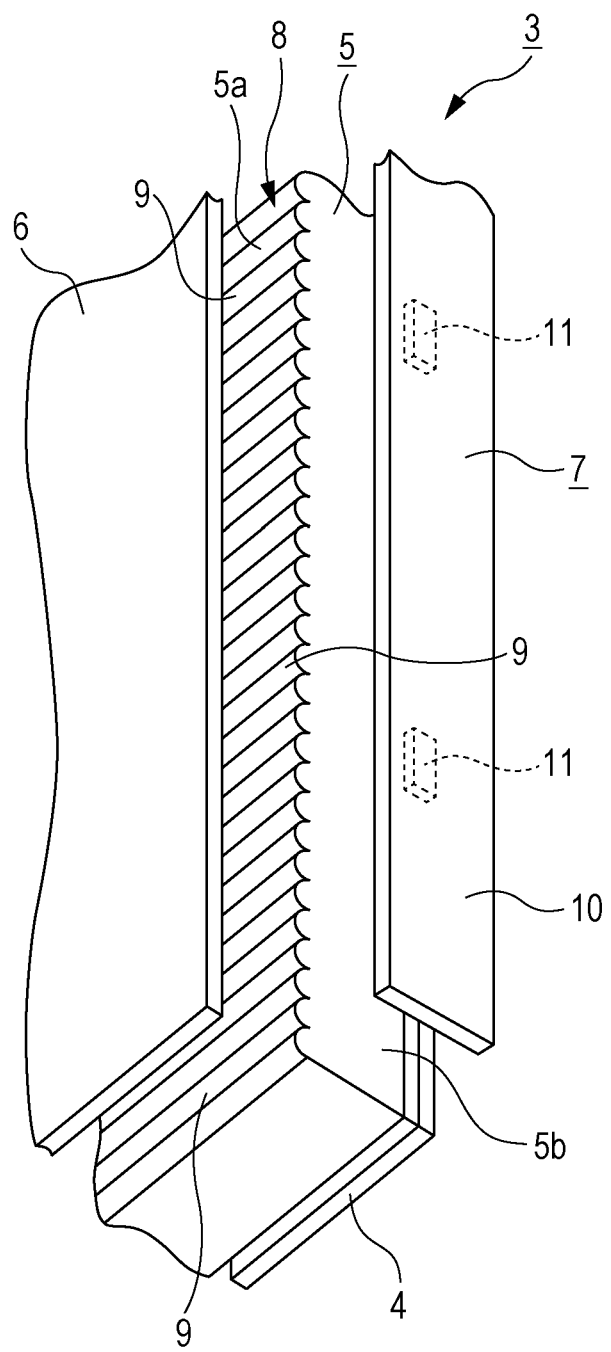
FIG. 4 is an expanded perspective view illustrating a part of a light-emitting device.

The plurality of light source units 7 is disposed in the light-incident surfaces 5b of the light guiding member 5, respectively, in various states and is disposed in the first direction (see FIGS. 2 and 3).

The light source units 7 are formed by a substrate 10 and a plurality of light-emitting elements 11 mounted on the substrate 10. The light-emitting elements 11 are mounted so as to be spaced in the first direction (see FIG. 4). For example, a light-emitting diode (LED) or an electro-luminescence element is used as the light-emitting elements 11.

For example, eight light source units 7 are arranged each on the both sides of the light guiding member 5 (see FIGS. 2 and 3). The light source units 7 are individually controlled by a driving circuit (not shown). When all of the light source units 7 are turned on, the light exits toward the display panel 2 in the entire region of the light guiding member 5 (see FIG. 2). The light source units 7 are controlled so as to be turned on sequentially in an arrangement direction (the first direction) and the light exits toward the display panel 2 in respective strip-shaped division regions (division region 1 to division region 8) of the light guiding member 5 (see FIG. 3), so that the light-emitting device 3 functions as a so-called scan backlight. The function of the scan backlight is performed when the light source units 7 are sequentially turned on in accordance with timings at which pixel lines are sequentially rewritten in the display panel 2.

FIG. 3 shows an example in which the light guiding member 5 is divided into eight regions in the first direction to form the division regions 1 to 8 sequentially from the upper side, the light source units 7 located at the third region from the upper side are controlled so as to be turned on, and the light exits from the third division region 3 from the upper side.

Light Path in Light-Emitting Device

When the light exits from the light-emitting elements 11 of the light source units 7 in the light-emitting device 3 with the above-described configuration, exiting light is incident on the light guiding member 5 from the light-incident surfaces 5b, is guided in the second direction inside the light guiding member 5, and is reflected inward in the concave-convex pattern 8 of the light guiding member 5. The light reflected inward in the concave-convex pattern 8 passes through the light control surface 5c of the light guiding member 5 or is reflected inward by the light control surface 5c of the light guiding member 5.

The light passing through the light control surface 5c of the light guiding member 5 is reflected from the reflection surface 4a of the reflection member 4, is incident again on the light guiding member 5 from the light control surface 5c, and exits from the light reflection/exit surface 5a. The light reflected inward from the light control surface 5c of the light guiding member 5 exits from the light reflection/exit surface 5a.

The light exiting from the light reflection/exit surface 5a of the light guiding member 5 is diffused by the optical sheet 6, goes toward the display panel 2 to be emitted to the display panel 2 as the backlight, and exits as video light from the display panel 2.

Control of Light of Light Guiding Member

Hereinafter, the control of the light by the light guiding member 5 of the light-emitting device 3 will be described (see FIGS. 6 to 11).

Figure 6:
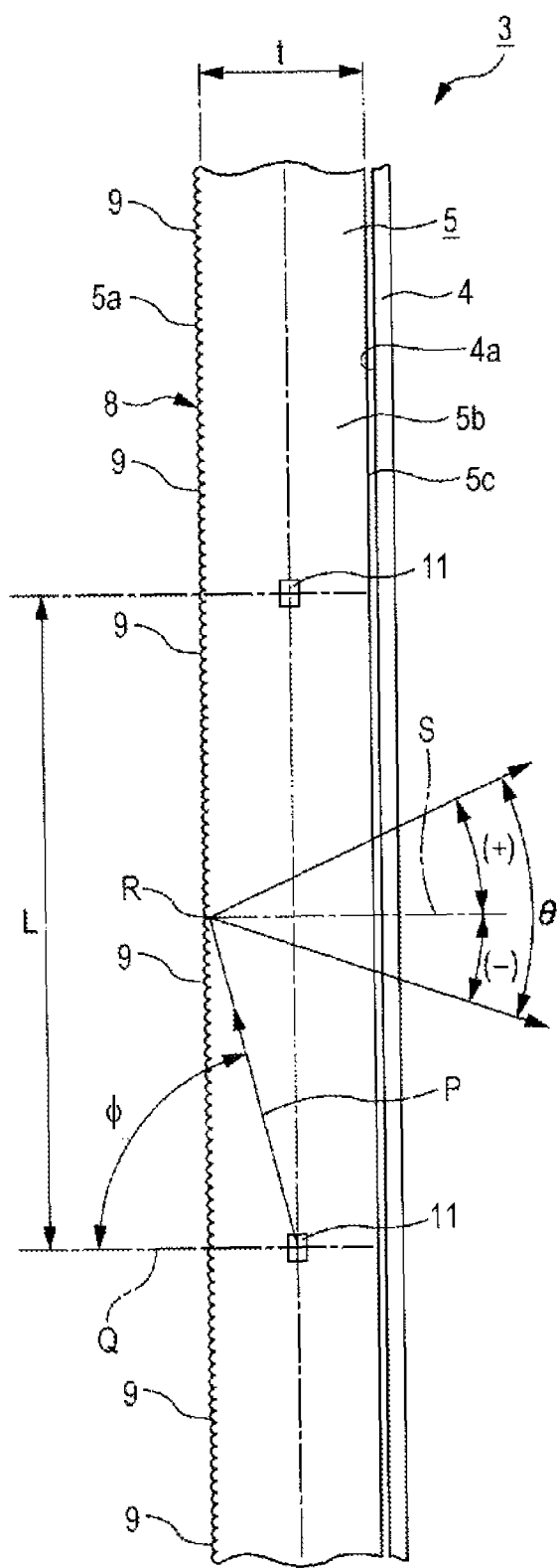
FIG. 6 is a side view illustrating light-emitting elements, the light guiding member, and a reflection member.

FIG. 6 is a conceptual diagram illustrating a state where the light-emitting elements 11, the light guiding member 5, and the reflection member 4 are viewed from the side of the light-incident surface 5b of the light guiding member 5. It is assumed that L is a distance between the central points of the light-emitting elements 11 and t is the thickness of the light guiding member 5. Further, it is assumed that an incident angle φ of the light exiting from the light-emitting element 11 on the light reflection/exit surface 5a is an angle between a line segment P, which is obtained by projecting a light path from the light-emitting element 11 to the light reflection/exit surface 5a on a surface parallel to the light-incident surface 5b, and a line segment Q, which extends from the central point of the light-emitting element 11 to the light reflection/exit surface 5a in the thickness direction. Furthermore, it is assumed that θ is the maximum angle range of the reflected light when the light incident at the incident angle φ is reflected inward from the light reflection/exit surface 5a. In the angle range θ, the ranges close to and distant from the light-emitting element 11 emitting the light are negative and positive ranges, respectively, with reference to a line segment S passing through a reflection point R of the reflected light from the light reflection/exit surface 5a and extending in the thickness direction.

In the light-emitting device 3, the value of the angle range θ decreases, as the value of the incident angle φ increases in a range of $0<φ<\tan^{-1}(L/t)$. Further, the angle range θ covers both of the positive range and the negative range. The control of the light is achieved by the predetermined shape of the convex portions 9 of the concave-convex pattern 8.

FIGS. 7 to 10 show cases where the incident angle φ is different in the light path when the light exiting from the light-emitting element 11 is reflected inward from the convex portion 9 in the range of $0<φ<\tan^{-1}(L/t)$. In each drawing, a dotted line indicates the light path of the light from the light-emitting element 11 to the convex portion 9 and a solid line indicates the light path of the light reflected inward from the convex portion 9.

Figure 7:
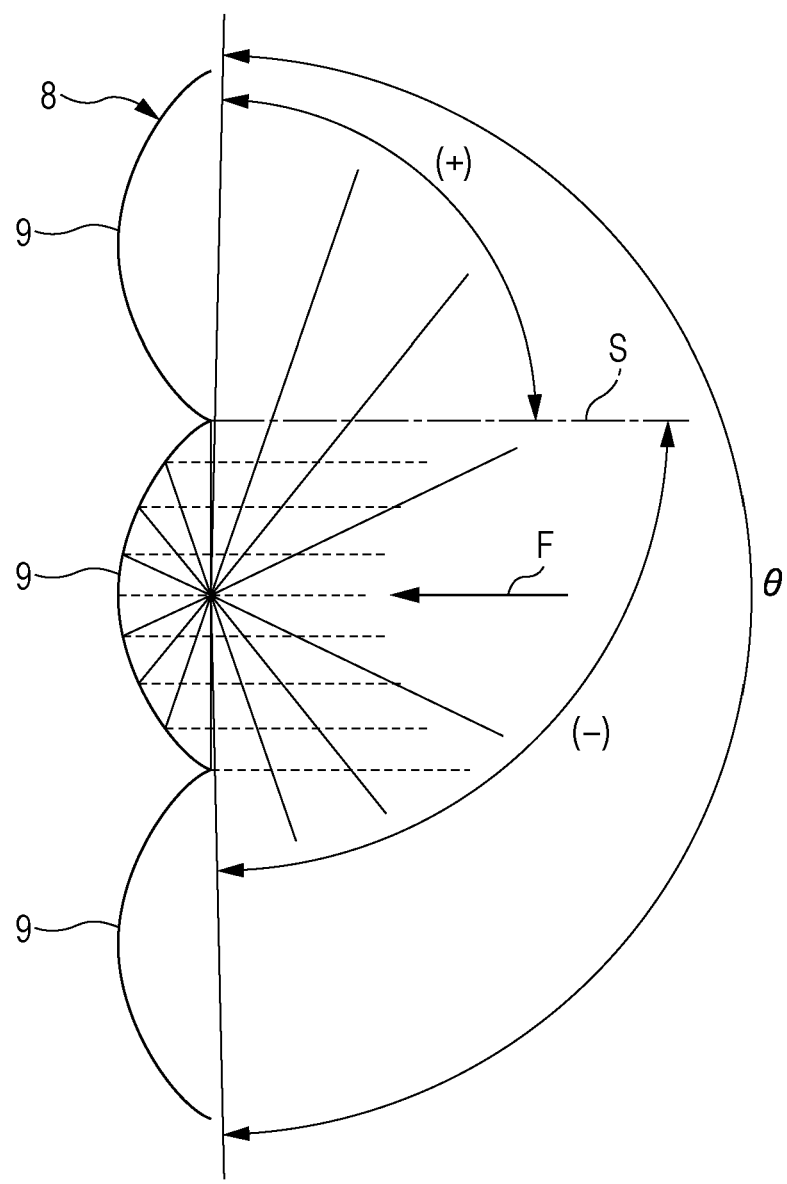
FIG. 7 is a diagram illustrating a case where an incident angle is different in a light path when light exiting from the light-emitting element is reflected inward from a convex portion, as in FIGS. 8 to 10, and is a conceptual diagram illustrating a light path when an incident angle is 0°.
Figure 8:
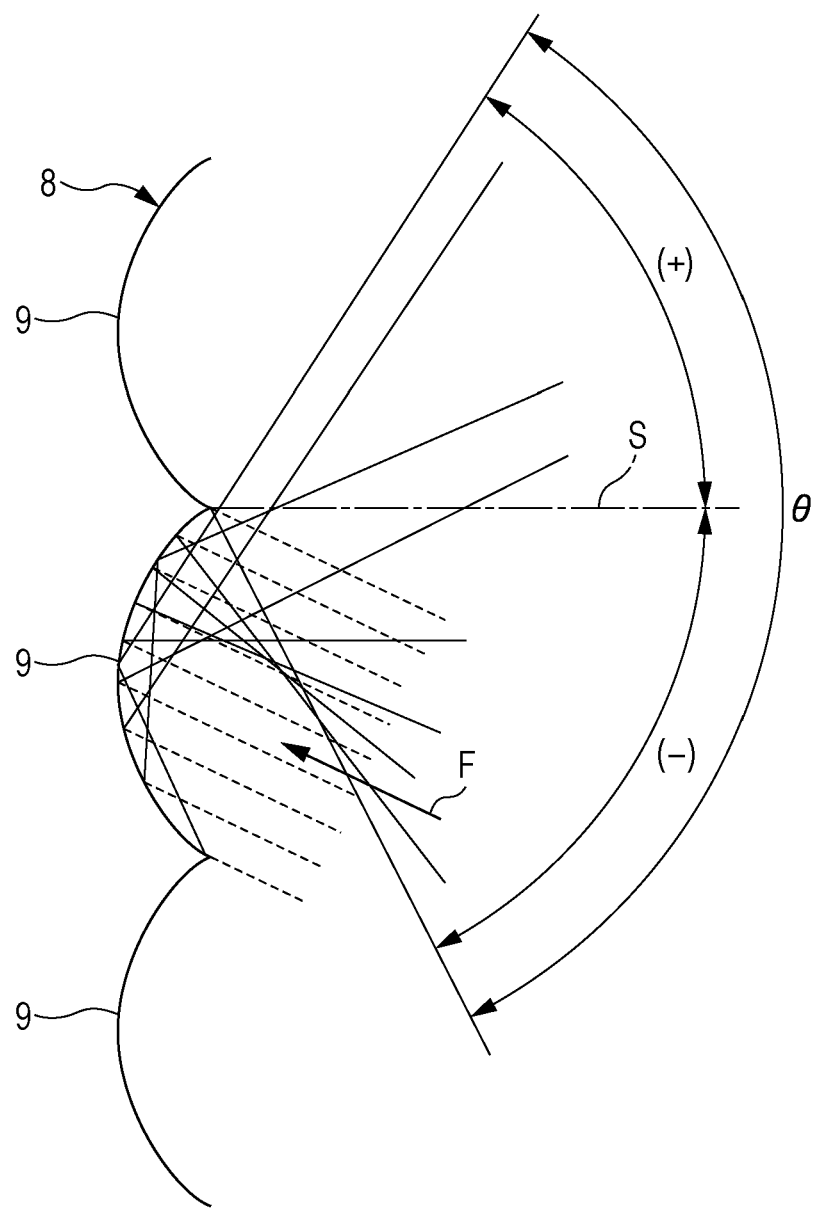
FIG. 8 is a conceptual diagram illustrating a light path when an incident angle is larger than the incident angle of FIG. 7.
Figure 9:
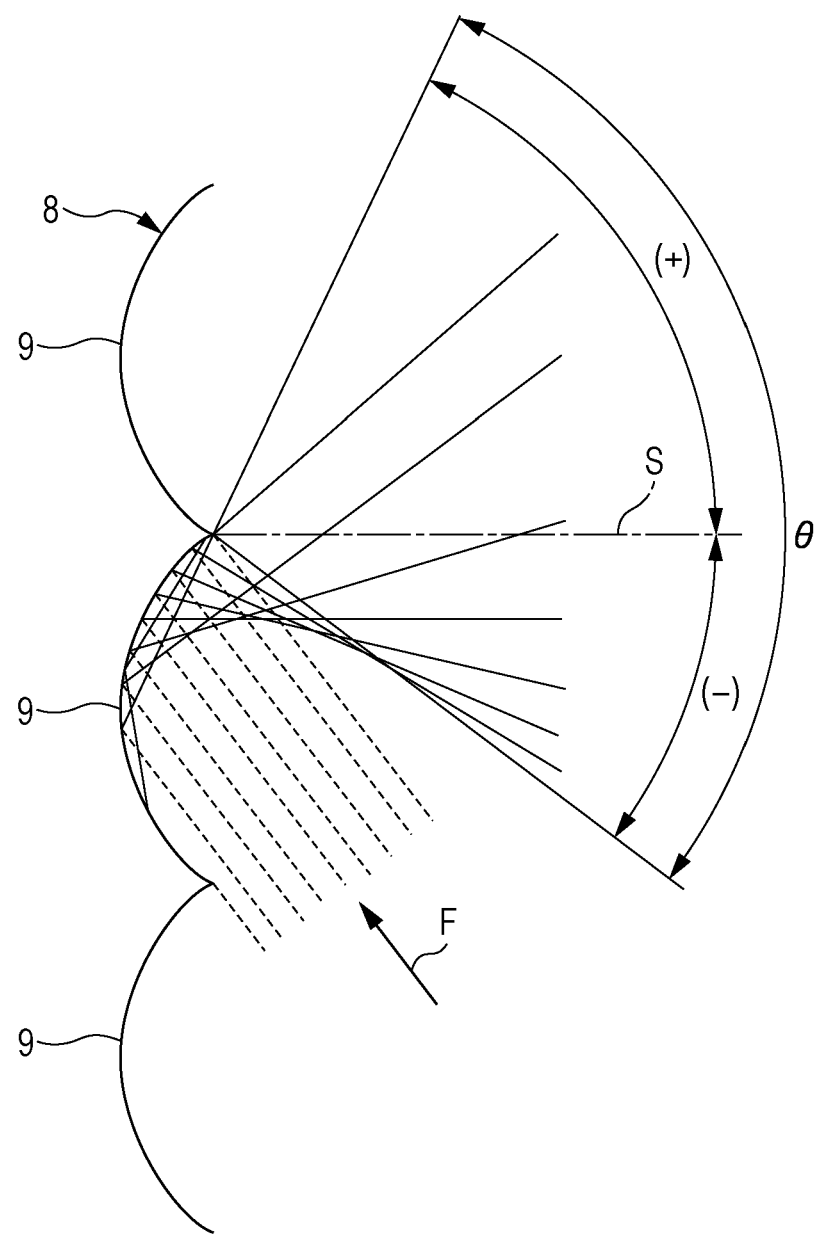
FIG. 9 is a conceptual diagram illustrating a light path when an incident angle is larger than the incident angle of FIG. 8.
Figure 10:
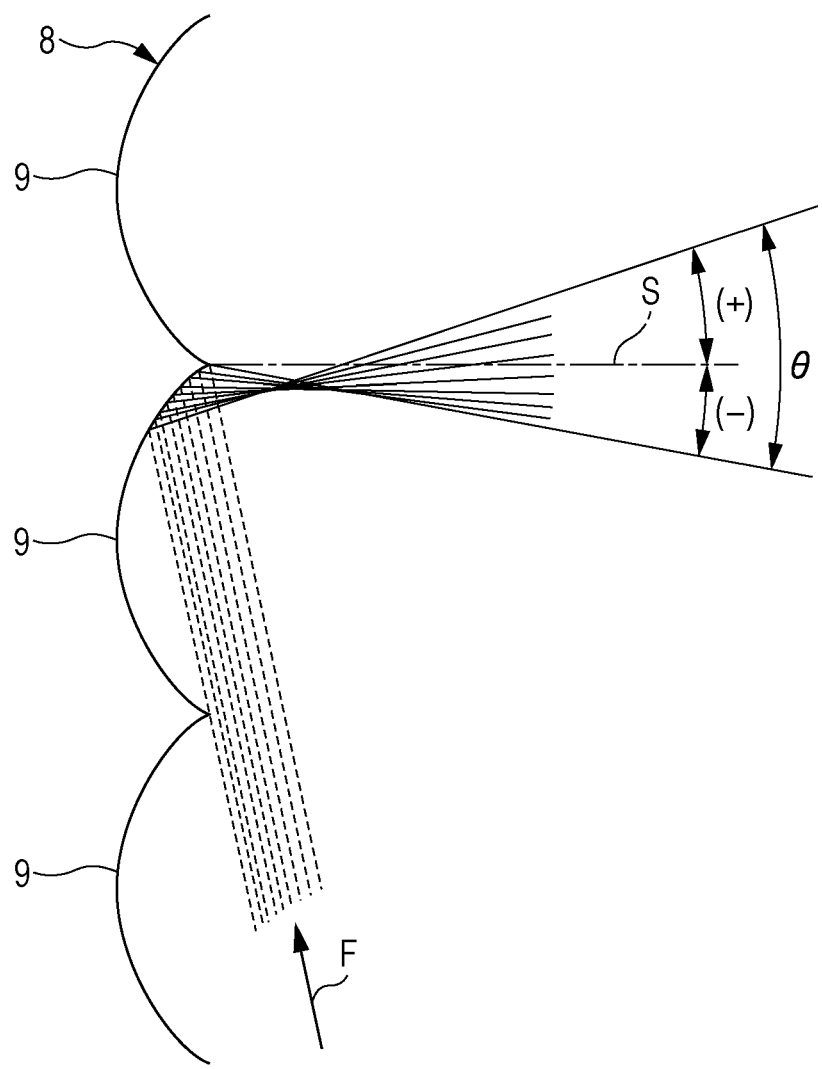
FIG. 10 is a conceptual diagram illustrating a light path when an incident angle is larger than the incident angle of FIG. 9.

FIG. 7 shows the light path when the incident angle φ is 0°. FIG. 8 shows the light path when the incident angle φ is larger than the incident angle φ of FIG. 7. FIG. 9 shows the light path when incident angle φ is larger than the incident angle φ of FIG. 8. FIG. 10 shows the light path when the incident angle φ is larger than the incident angle φ of FIG. 9.

As shown in FIGS. 7 to 10, it can be understood that the value of the angle range θ decreases as the value of the incident angle φ increases in the range of $0<φ<\tan^{-1}(L/t)$ in the concave-convex pattern 8 of the light-emitting device 3. Further, it can be understood that the angle range θ covers both of the positive range and the negative range.

Figure 11:
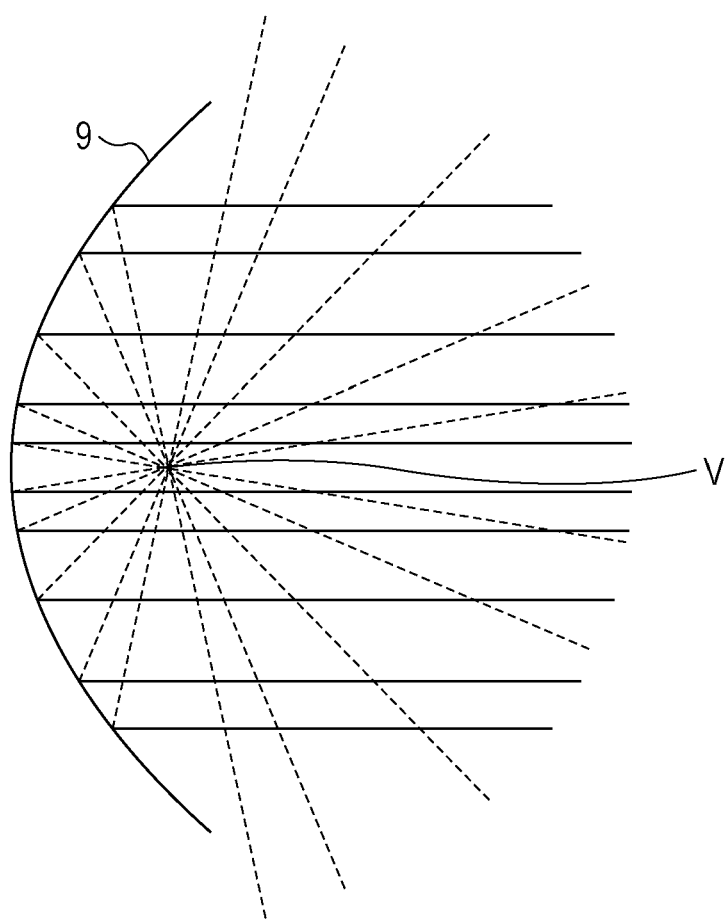
FIG. 11 is a conceptual diagram illustrating a light path when light passing through a focus of the convex portion is reflected inward.

The convex portion 9 is configured so as to satisfy the equation of "$Y=-X^2/4a+a$." As shown in FIG. 11, all of the light passing through a focus V of the convex portion 9 and reflected inward from the convex portion 9 travel in the thickness direction of the light guiding member 5.

FIRST MODIFIED EXAMPLE

Next, a concave-convex pattern 8A according to a first modified example will be described (see FIGS. 12 and 13).

In the concave-convex pattern 8A, convex portions 9A which protrude toward the front side and extend in the horizontal direction, which is the second direction, are continuously formed in the vertical direction, which is the first direction. The concave-convex pattern 8A has a function of guiding the light toward the reflection member 4 by inward reflecting the light exiting from the light source units 7 and incident on the light guiding member 5.

In the convex portions 9A, the outer shape of the cross section parallel to the light-incident surface 5b is configured as, for example, a shape in which two circular arcs are continuously formed and a central point in the first direction is located on the most front side.

As in the concave-convex pattern 8, in the concave-convex pattern 8A, the value of the angle range θ also decreases, as the value of the incident angle φ increases in a range of $0 < \phi < \tan^{-1}(L/t)$. Further, the angle range θ covers both of the positive range and the negative range.

Figure 12:
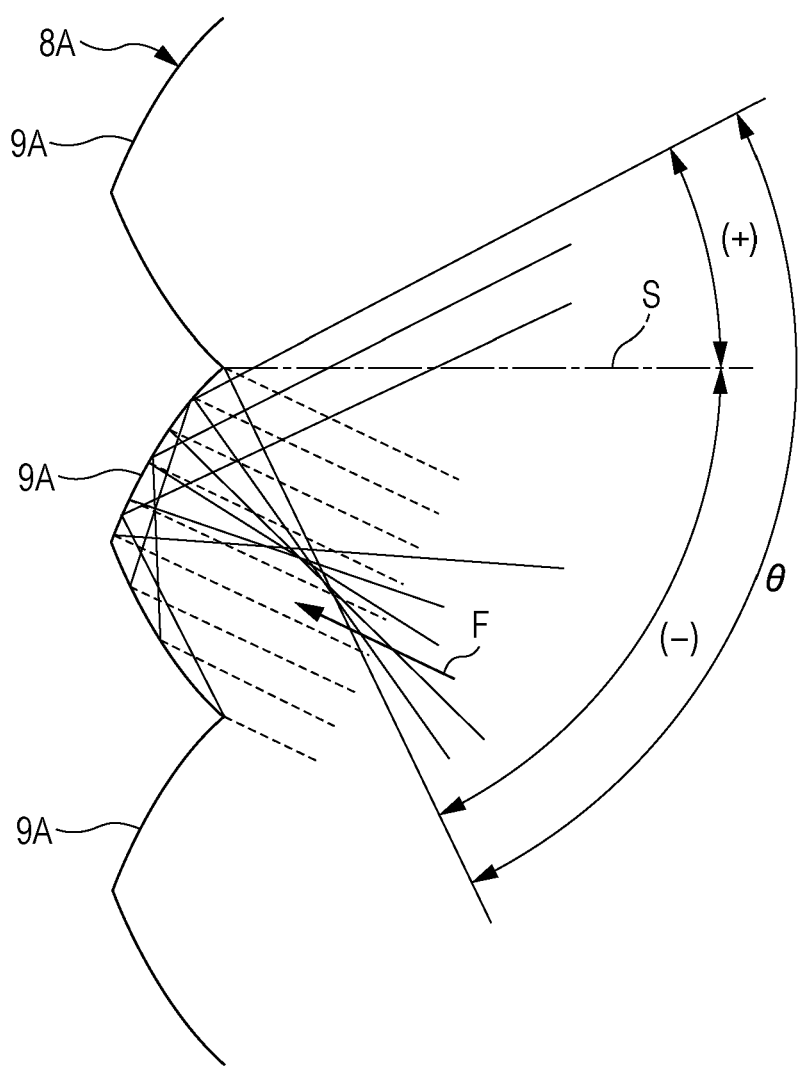
FIG. 12 is a diagram illustrating a case where an incident angle is different in a light path when light exiting from the light-emitting element is reflected inward in the convex portion in a concave-convex pattern according to a first modified example, as in FIG. 13, and is a conceptual diagram illustrating the light path when the incident angle is small.
Figure 13:
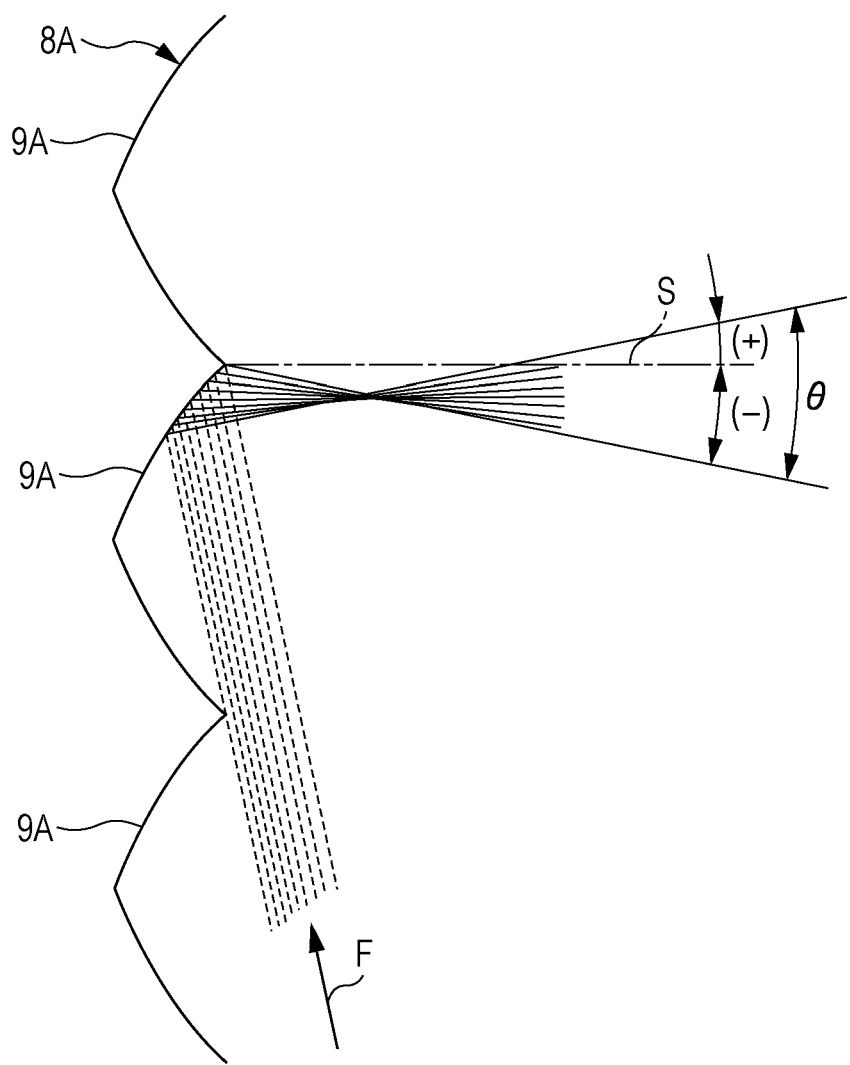
FIG. 13 is a conceptual diagram illustrating a light path when an incident angle is larger than the incident angle of FIG. 12.

FIGS. 12 and 13 show cases where the incident angle is different in the light path when the light exiting from the light-emitting element 11 is reflected inward from the convex portion 9A in the range of $0 < \phi < \tan^{-1}(L/t)$. In each drawing, a dotted line indicates the light path of the light from the light-emitting element 11 to the convex portion 9A and a solid line indicates the light path of the light reflected inward from the convex portion 9A.

FIG. 12 shows the light path when the incident angle φ is smaller. FIG. 13 shows the light path when the incident angle φ is larger than the incident angle φ of FIG. 12.

As shown in FIGS. 12 and 13, it can be understood that the value of the angle range θ decreases as the value of the incident angle φ increases in the range of $0 < \phi < \tan^{-1}(L/t)$ in the concave-convex pattern 8A of the light-emitting device 3. Further, it can be understood that the angle range θ covers both of the positive range and the negative range.

SECOND MODIFIED EXAMPLE

Next, a concave-convex pattern 8B according to a second modified example will be described (see FIGS. 14 and 15).

In the concave-convex pattern 8B, convex portions 9B which protrude toward the front side and extend in the horizontal direction, which is the second direction, are continuously formed in the vertical direction, which is the first direction. The concave-convex pattern 8B has a function of guiding the light toward the reflection member 4 by inward reflecting the light exiting from the light source units 7 and incident on the light guiding member 5.

In the convex portions 9B, the outer shape of the cross section parallel to the light-incident surface 5b is configured as, for example, a shape in which two circular arcs are continuously formed and a minute concave portion is formed at a central point in the first direction. The curvature radius of the circular arc of the convex portion 9B is smaller than the curvature radius of the circular arc of the convex portion 9A of the concave-convex pattern 8A according to the first modified example.

As in the concave-convex patterns 8 and 8A, in the concave-convex pattern 8B, the value of the angle range θ also decreases, as the value of the incident angle φ increases in the range of $0 < \phi < \tan^{-1}(L/t)$. Further, the angle range θ covers both of the positive range and the negative range.

Figure 14:
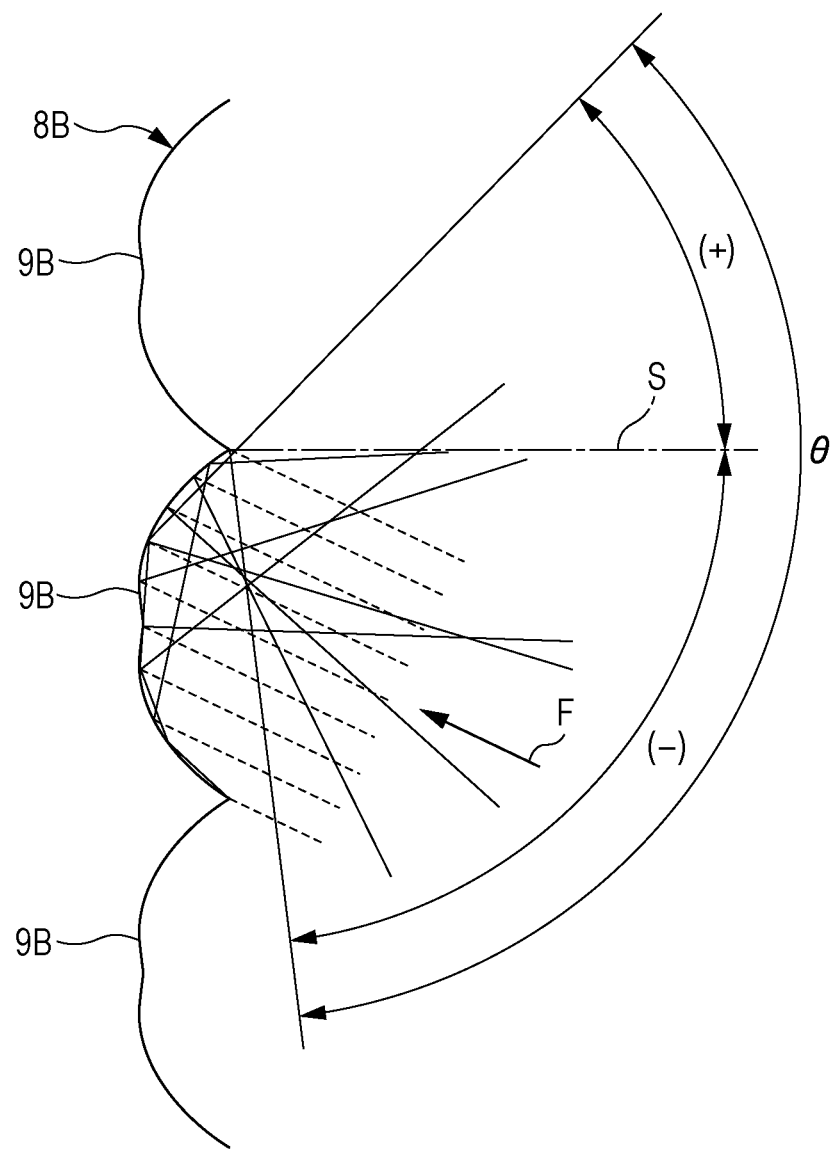
FIG. 14 is a diagram illustrating a case where an incident angle is different in a light path when light exiting from the light-emitting element is reflected inward in the convex portion in a concave-convex pattern according to a second modified example, as in FIG. 15, and is a conceptual diagram illustrating the light path when the incident angle is small.
Figure 15:
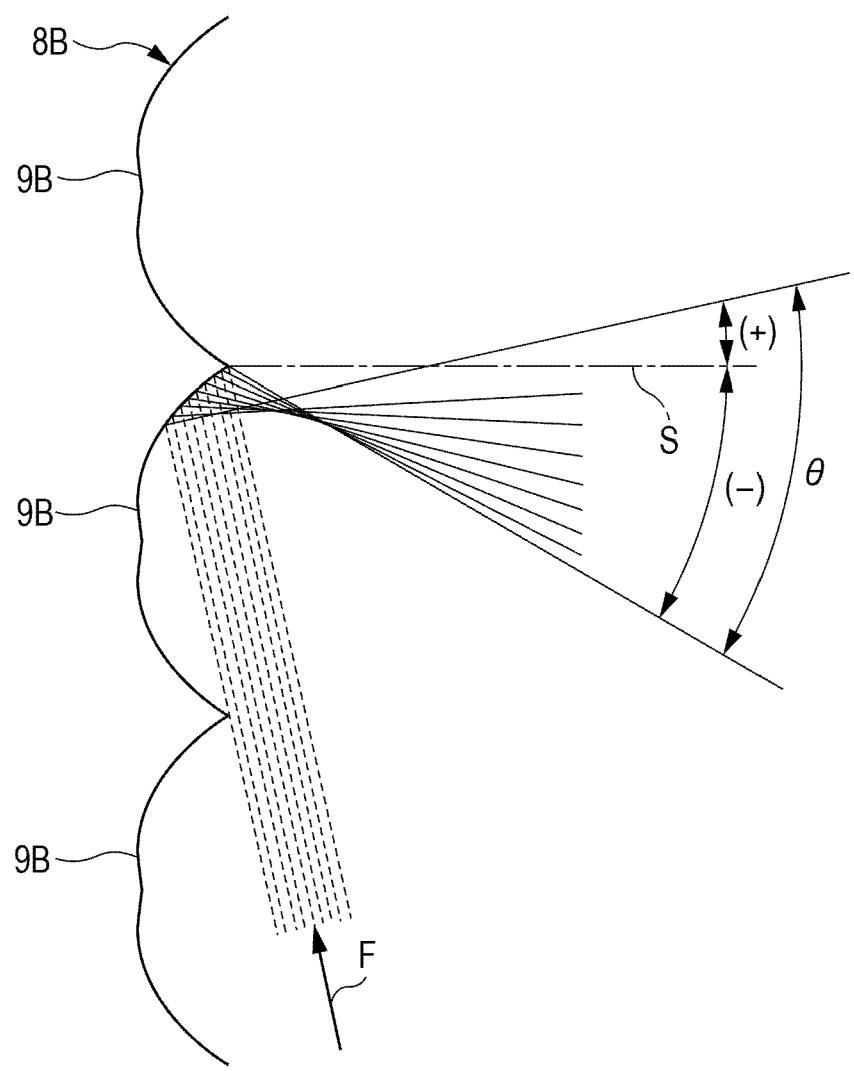
FIG. 15 is a conceptual diagram illustrating a light path when an incident angle is larger than the incident angle of FIG. 14.

FIGS. 14 and 15 show cases where the incident angle is different in the light path when the light exiting from the light-emitting element 11 is reflected inward from the convex portion 9B in the range of $0 < \phi < \tan^{-1}(L/t)$. In each drawing, a dotted line indicates the light path of the light from the light-emitting element 11 to the convex portion 9B and a solid line indicates the light path of the light reflected inward from the convex portion 9B.

FIG. 14 shows the light path when the incident angle φ is smaller. FIG. 15 shows the light path when the incident angle φ is larger than the incident angle φ of FIG. 14.

As shown in FIGS. 14 and 15, it can be understood that the value of the angle range θ decreases as the value of the incident angle φ increases in the range of $0 < \phi < \tan^{-1}(L/t)$ in the concave-convex pattern 8B of the light-emitting device 3. Further, it can be understood that the angle range θ covers both of the positive range and the negative range.

COMPARATIVE EXAMPLES

Next, the shape (concave-convex pattern) of the surface of the light guiding member will be described according to comparative examples (related art) (see FIGS. 16 to 25).

Figure 16:
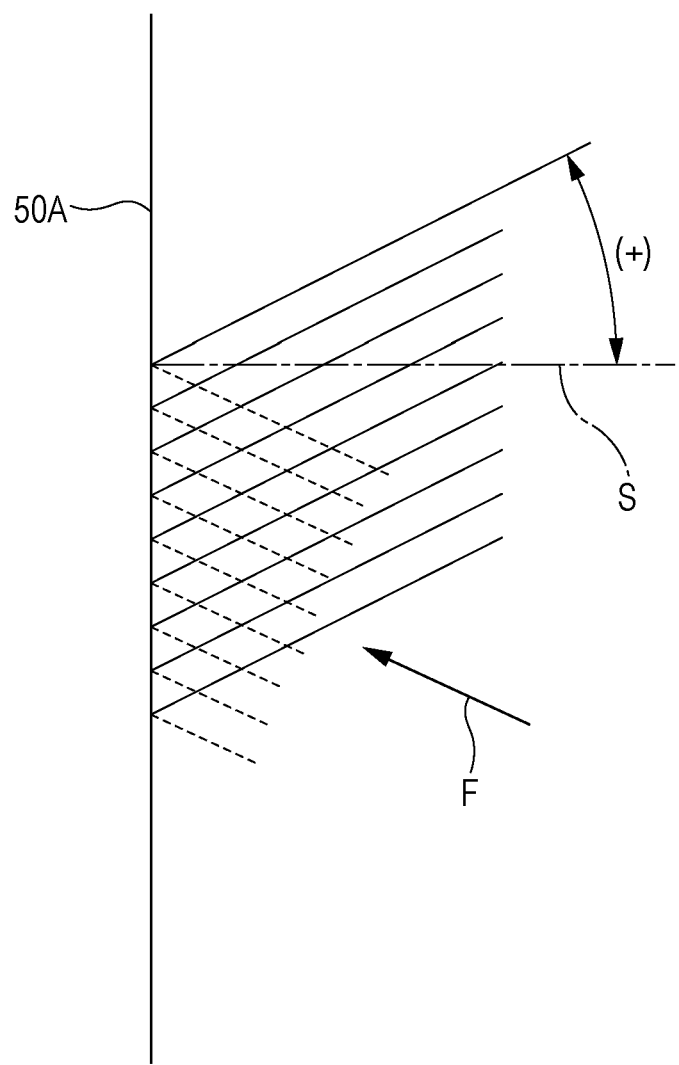
FIG. 16 is a diagram illustrating a case where an incident angle is different in a light path when light exiting from the light-emitting element is reflected inward in the convex portion in a concave-convex pattern according to a first comparative example, as in FIG. 17, and is a conceptual diagram illustrating the light path when the incident angle is small.
Figure 17:
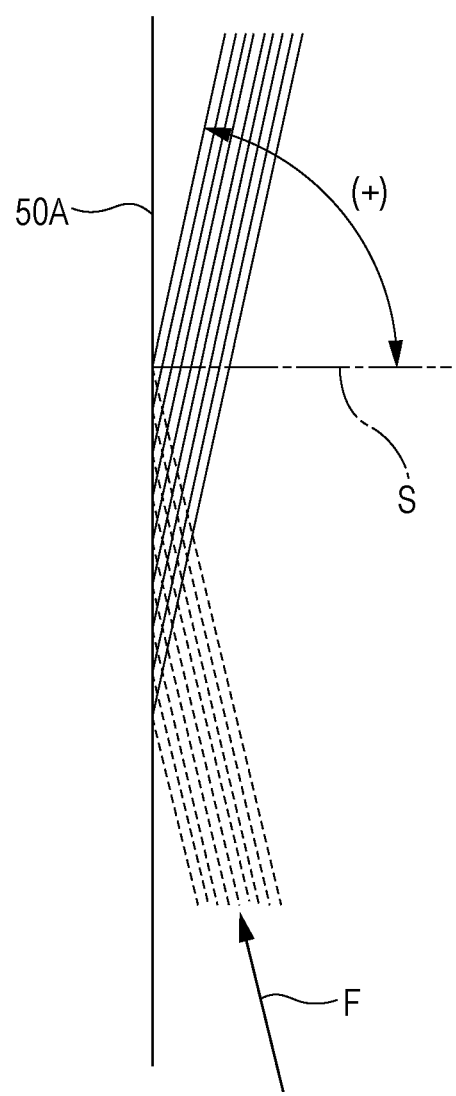
FIG. 17 is a conceptual diagram illustrating a light path when an incident angle is larger than the incident angle of FIG. 16.

In a shape 50A according to a first comparative example, a light-incident surface is formed in a planar shape (see FIGS. 16 and 17).

FIGS. 16 and 17 show cases where an incident angle is different in a light path when the light emitted from the light-emitting element is reflected inward from the shape 50A in the range of $0 < \phi < \tan^{-1}(L/t)$. In each drawing, a dotted line indicates the light path of the light from the light-emitting element to the shape 50A and a solid line indicates the light path of the light reflected inward from the shape 50A.

FIG. 16 shows the light path when the incident angle φ is smaller. FIG. 17 shows the light path when the incident angle φ is larger than the incident angle φ of FIG. 16.

As shown in FIGS. 16 and 17, it can be understood that the value of the angle range θ increases as the value of the incident angle φ increases in the range of $0 < \phi < \tan^{-1}(L/t)$ in the shape 50A. Further, it can be understood that the angle range θ does not cover both of the positive range and the negative range.

Figure 18:
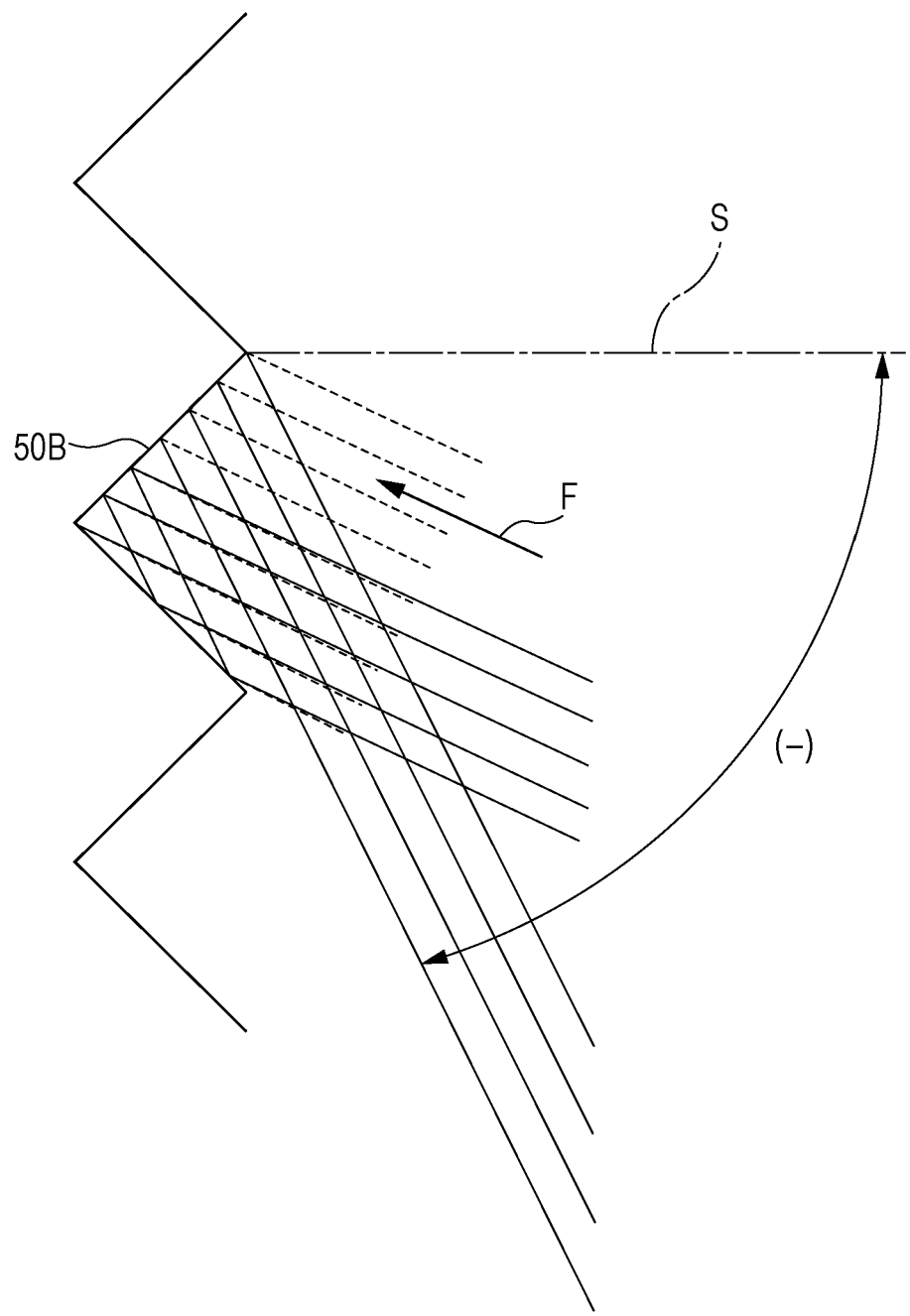
FIG. 18 is a diagram illustrating a case where an incident angle is different in a light path when light exiting from the light-emitting element is reflected inward in the convex portion in a concave-convex pattern according to a second comparative example, as in FIG. 19, and is a conceptual diagram illustrating the light path when the incident angle is small.
Figure 19:
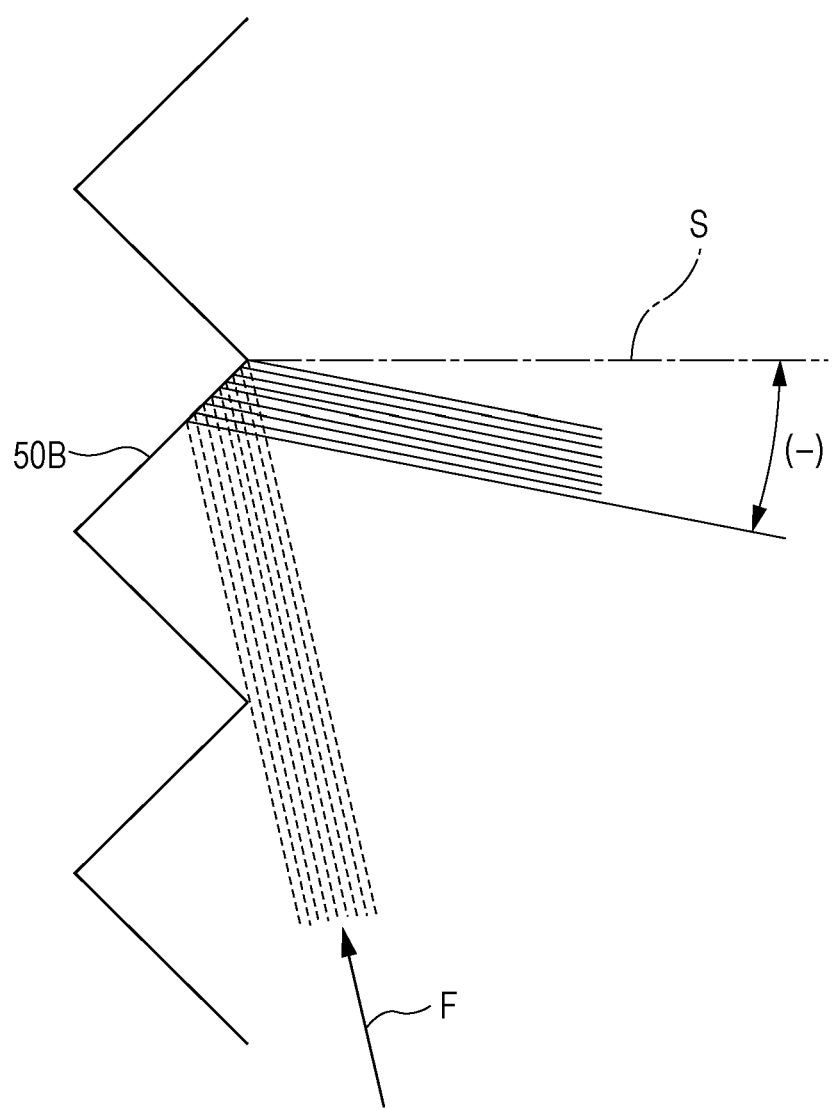
FIG. 19 is a conceptual diagram illustrating a light path when an incident angle is larger than the incident angle of FIG. 18.

In the concave-convex pattern 50B according to a second comparative example, convex portions 51B which protrude toward the front side and extend in the horizontal direction, which is the second direction, are continuously formed in the vertical direction, which is the first direction (see FIGS. 18 and 19).

In the convex portions 51B, the outer shape of the cross section parallel to the light-incident surface is formed as a triangular shape.

FIGS. 18 and 19 show cases where the incident angle is different in the light path when the light exiting from the light-emitting element is reflected inward from the convex portion 51B in the range of $0 < \phi < \tan^{-1}(L/t)$. In each drawing, a dotted line indicates the light path of the light from the light-emitting element to the convex portion 51B and a solid line indicates the light path of the light reflected inward from the convex portion 51B.

FIG. 18 shows the light path when the incident angle φ is smaller. FIG. 19 shows the light path when the incident angle φ is larger than the incident angle φ of FIG. 18.

As shown in FIGS. 18 and 19, it can be understood that the value of the angle range θ decreases as the value of the incident angle φ increases in the range of $0 < \phi < \tan^{-1}(L/t)$ in the concave-convex pattern 50B. However, it can be understood that the angle range θ does not cover both of the positive range and the negative range.

Figure 20:
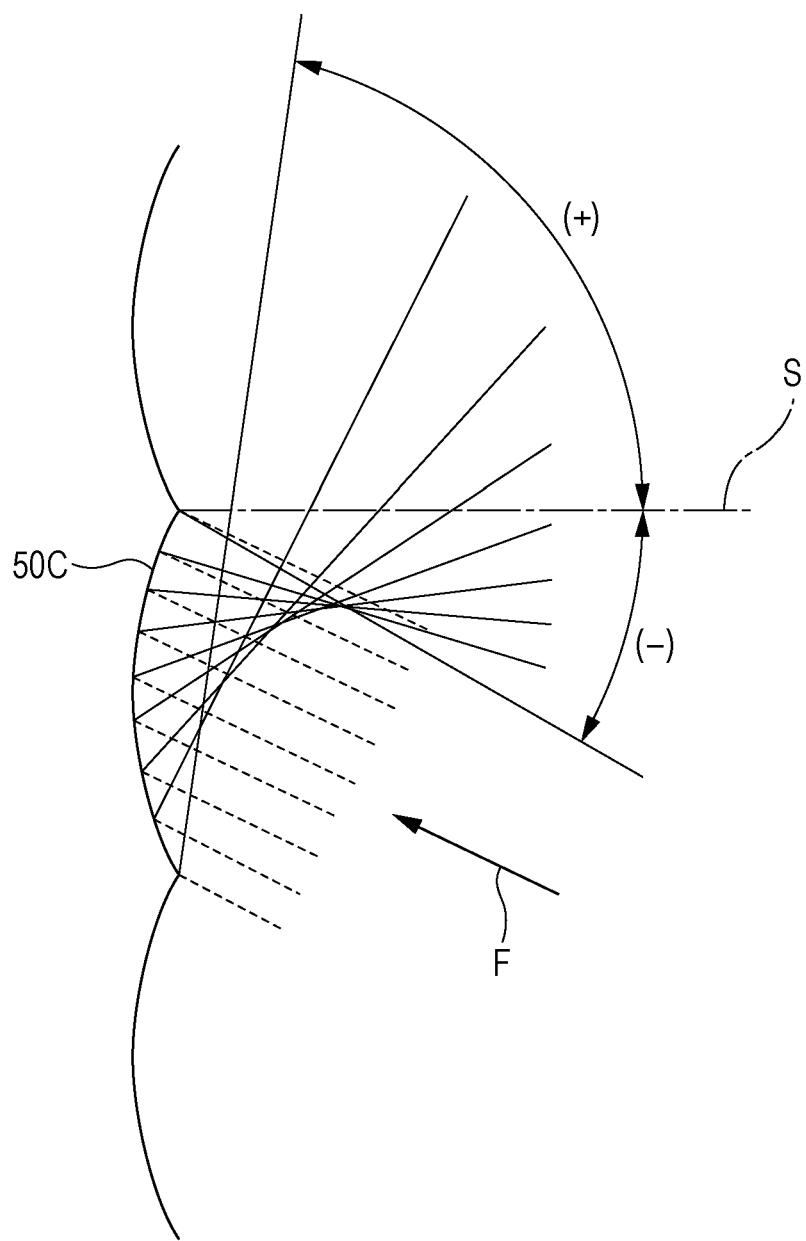
FIG. 20 is a diagram illustrating a case where an incident angle is different in a light path when light exiting from the light-emitting element is reflected inward in the convex portion in a concave-convex pattern according to a third comparative example, as in FIG. 21, and is a conceptual diagram illustrating the light path when the incident angle is small.
Figure 21:
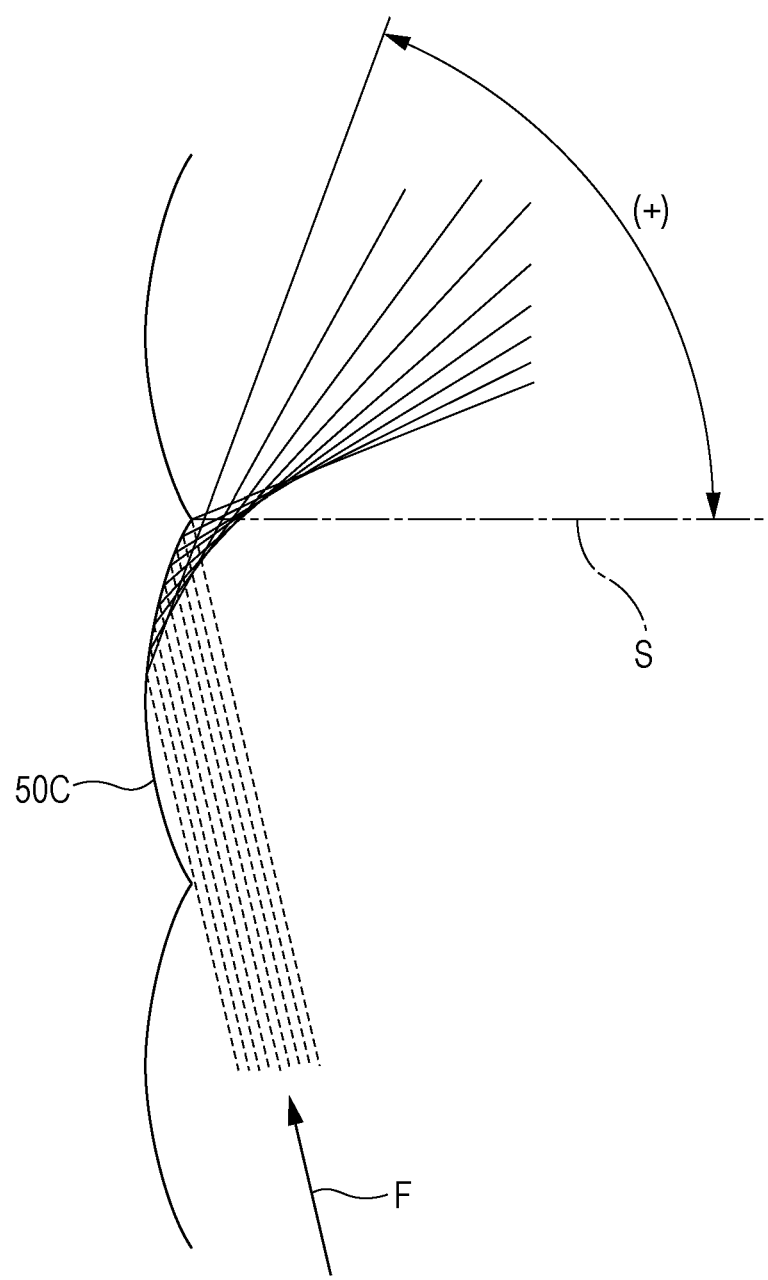
FIG. 21 is a conceptual diagram illustrating a light path when an incident angle is larger than the incident angle of FIG. 20.

In the concave-convex pattern 50C according to a third comparative example, convex portions 51C which protrude toward the front side and extend in the horizontal direction, which is the second direction, are continuously formed in the vertical direction, which is the first direction (see FIGS. 20 and 21).

In the convex portions 51C, the outer shape of the cross section parallel to the light-incident surface is formed as a convex arc shape on the front side.

FIGS. 20 and 21 show cases where the incident angle is different in the light path when the light exiting from the light-emitting element is reflected inward from the convex portion 51C in the range of $0 < \phi < \tan^{-1}(L/t)$. In each drawing, a dotted line indicates the light path of the light from the light-emitting element to the convex portion 51C and a solid line indicates the light path of the light reflected inward from the convex portion 51C.

FIG. 20 shows the light path when the incident angle φ is smaller. FIG. 21 shows the light path when the incident angle φ is larger than the incident angle φ of FIG. 20.

As shown in FIGS. 20 and 21, it can be understood that the value of the angle range θ decreases as the value of the incident angle φ increases in the range of $0<\phi<\tan^{-1}$ (L/t) in the concave-convex pattern 50C. However, it can be understood that the angle range θ does not cover both of the positive range and the negative range.

Figure 22:
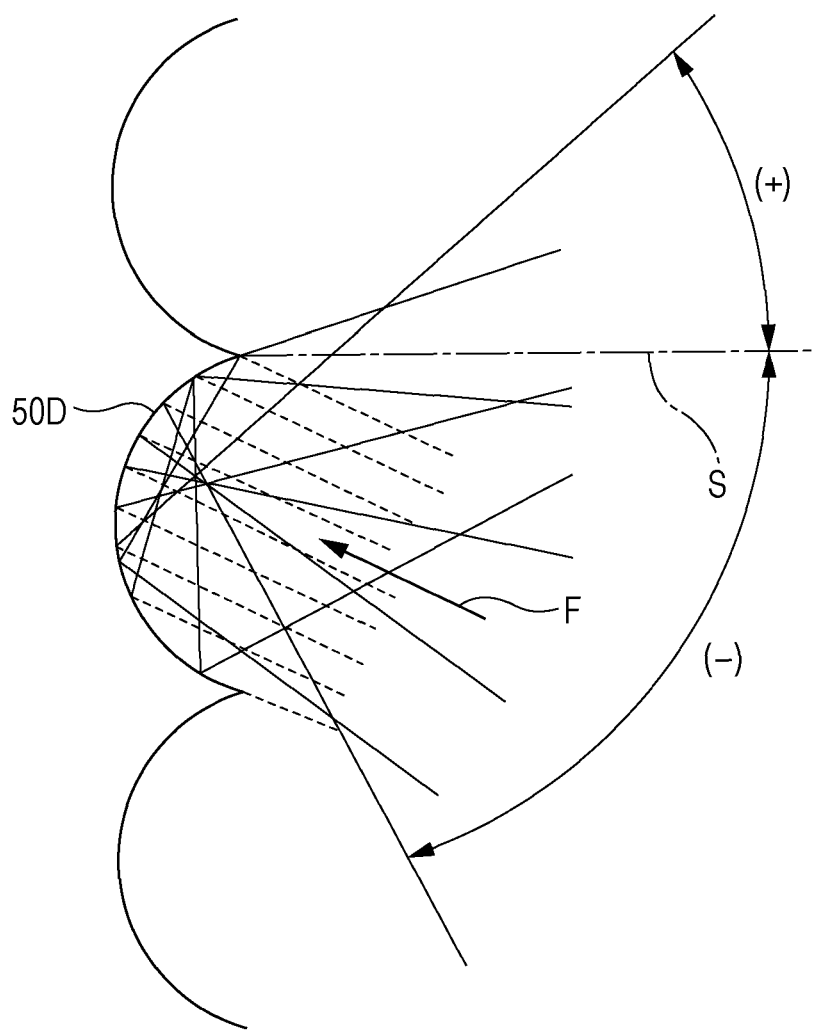
FIG. 22 is a diagram illustrating a case where an incident angle is different in a light path when light exiting from the light-emitting element is reflected inward in the convex portion in a concave-convex pattern according to a fourth comparative example, as in FIG. 23, and is a conceptual diagram illustrating the light path when the incident angle is small.
Figure 23:
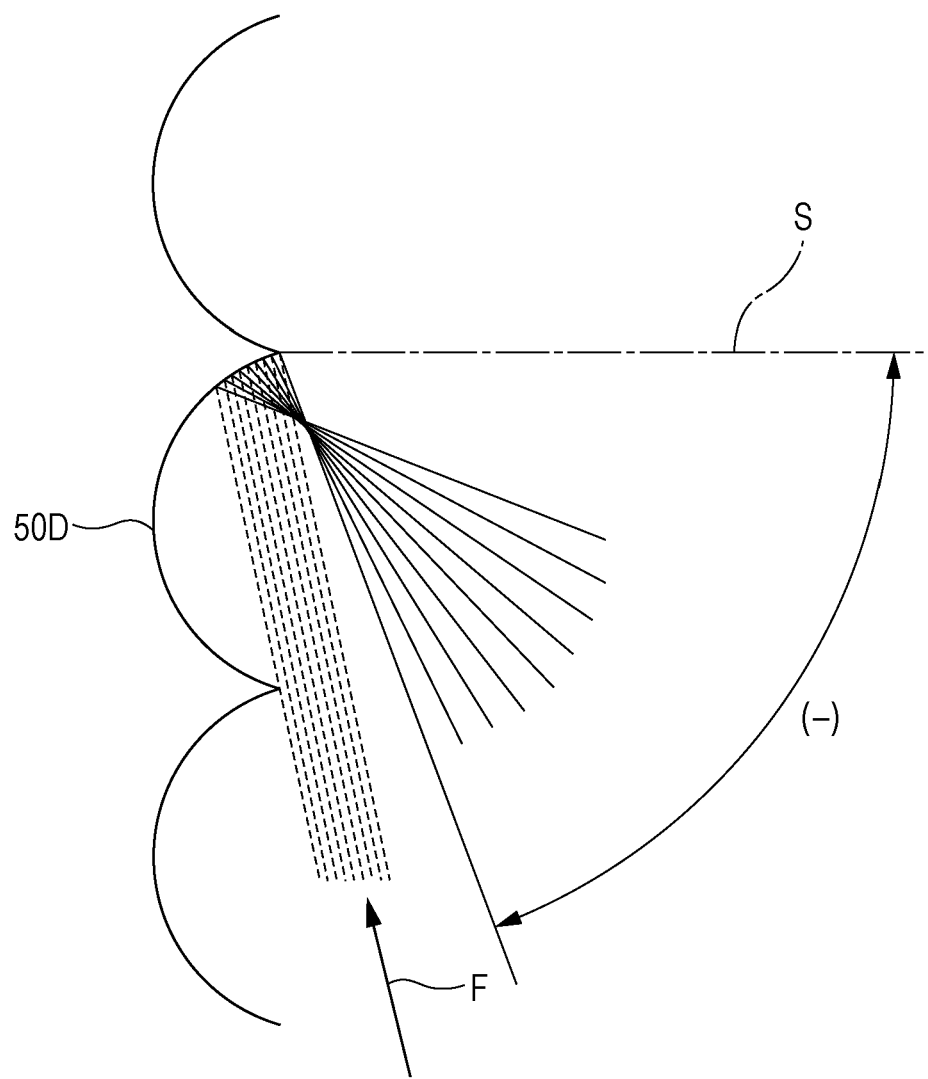
FIG. 23 is a conceptual diagram illustrating a light path when an incident angle is larger than the incident angle of FIG. 22.

In the concave-convex pattern 50D according to a fourth comparative example, convex portions 51D which protrude toward the front side and extend in the horizontal direction, which is the second direction, are continuously formed in the vertical direction, which is the first direction (see FIGS. 22 and 23).

In the convex portions 51D, the outer shape of the cross section parallel to the light-incident surface is formed as a convex arc shape on the front side. The curvature radius of the arc of the convex portion 51D is smaller than the curvature radius of the arc of the convex portion 51C of the concave-convex pattern 50C according to the third comparative example.

FIGS. 22 and 23 show cases where the incident angle is different in the light path when the light exiting from the light-emitting element is reflected inward from the convex portion 51D in the range of $0<\phi<\tan^{-1}$ (L/t). In each drawing, a dotted line indicates the light path of the light from the light-emitting element to the convex portion 51D and a solid line indicates the light path of the light reflected inward from the convex portion 51D.

FIG. 22 shows the light path when the incident angle φ is smaller. FIG. 23 shows the light path when the incident angle φ is larger than the incident angle φ of FIG. 22.

As shown in FIGS. 22 and 23, it can be understood that the value of the angle range θ decreases as the value of the incident angle φ increases in the range of $0<\phi<\tan^{-1}$ (L/t) in the concave-convex pattern 50D. However, it can be understood that the angle range θ does not cover both of the positive range and the negative range.

Figure 24:
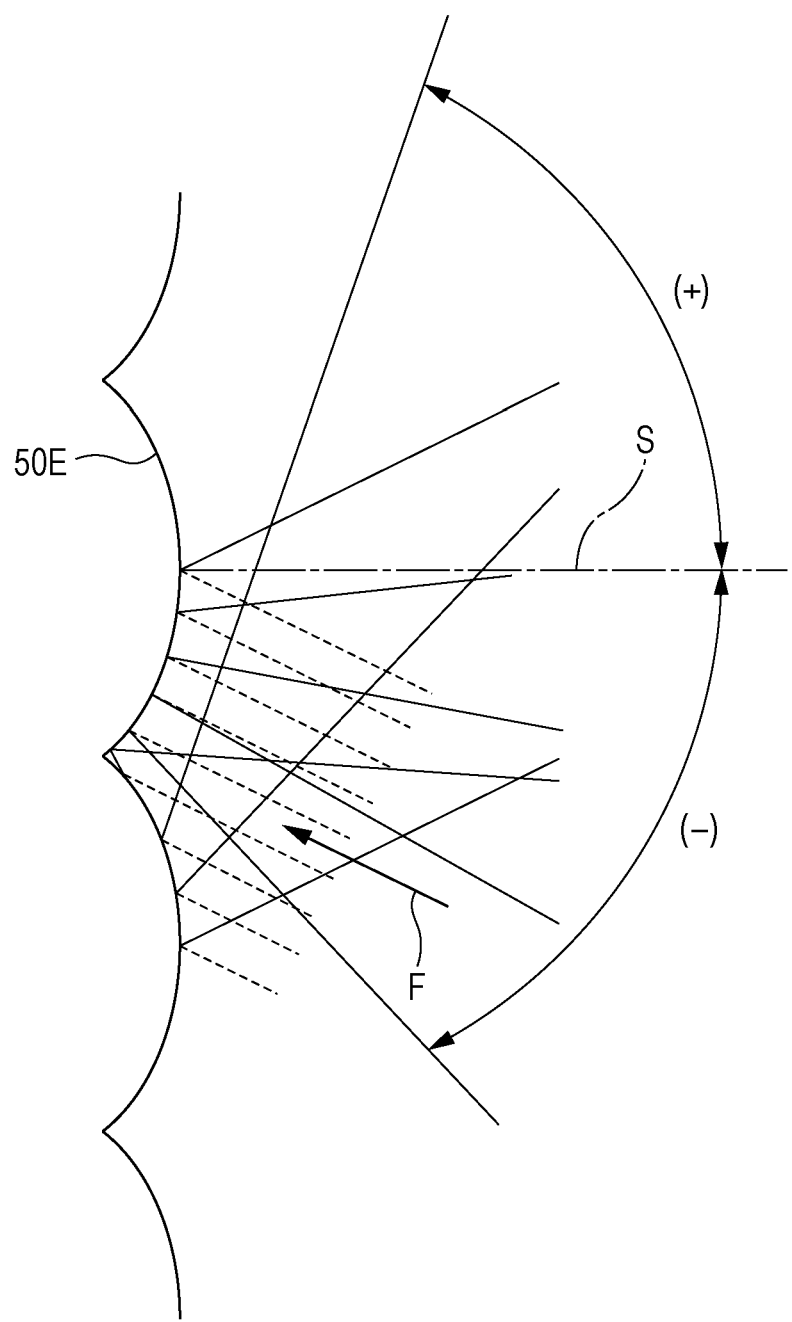
FIG. 24 is a diagram illustrating a case where an incident angle is different in a light path when light exiting from the light-emitting element is reflected inward in the convex portion in a concave-convex pattern according to a fifth comparative example, as in FIG. 25, and is a conceptual diagram illustrating the light path when the incident angle is small.
Figure 25:
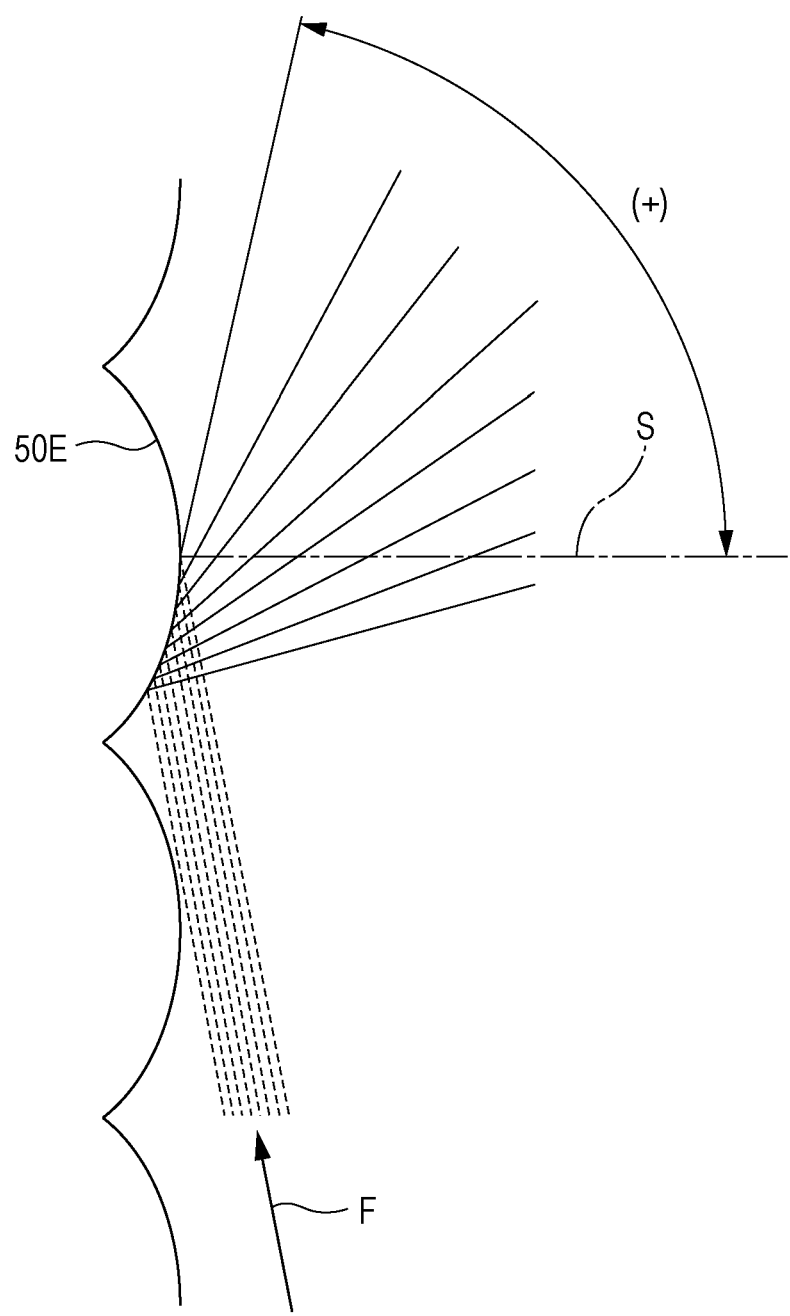
FIG. 25 is a conceptual diagram illustrating a light path when an incident angle is larger than the incident angle of FIG. 24.

In the concave-convex pattern 50E according to a fifth comparative example, convex portions 51E which extend in the horizontal direction, which is the second direction, are continuously formed in the vertical direction, which is the first direction (see FIGS. 24 and 25).

In the convex portions 51E, the outer shape of the cross section parallel to the light-incident surface is formed as a concave arc shape on the front side.

FIGS. 24 and 25 show cases where the incident angle is different in the light path when the light exiting from the light-emitting element is reflected inward from the convex portion 51E in the range of $0<\phi<\tan^{-1}$ (L/t). In each drawing, a dotted line indicates the light path of the light from the light-emitting element to the convex portion 51E and a solid line indicates the light path of the light reflected inward from the convex portion 51E.

FIG. 24 shows the light path when the incident angle φ is smaller. FIG. 25 shows the light path when the incident angle φ is larger than the incident angle φ of FIG. 24.

As shown in FIGS. 24 and 25, it can be understood that the value of the angle range θ decreases as the value of the incident angle φ increases in the range of $0<\phi<\tan^{-1}$ (L/t) in the concave-convex pattern 50E. However, it can be understood that the angle range θ does not cover both of the positive range and the negative range when the value of the incident angle φ increases.

THIRD MODIFIED EXAMPLE

Figure 26:
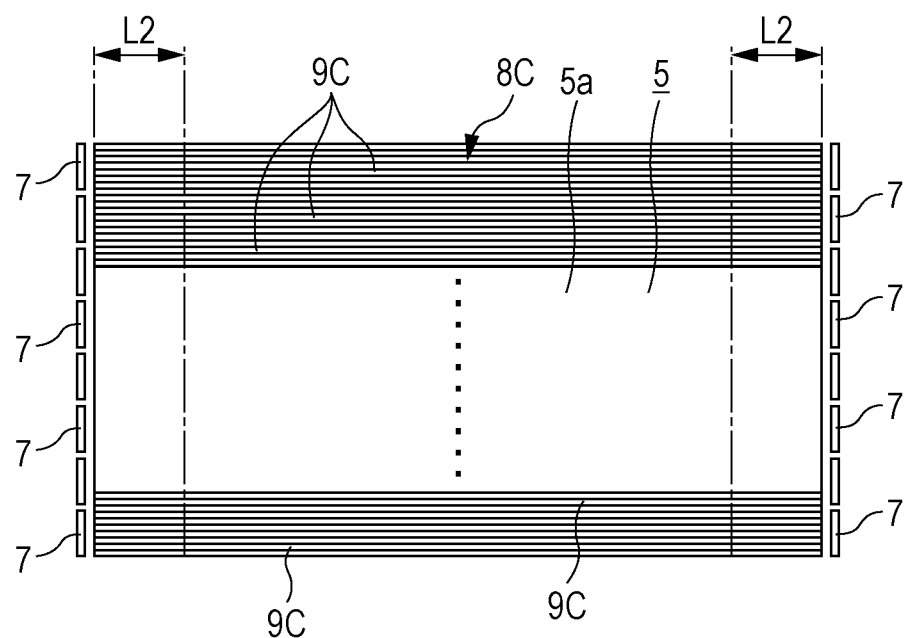
FIG. 26 is a conceptual diagram illustrating a concave-convex pattern according to a third modified example.

Next, a concave-convex pattern 8C according to a third modified example will be described (see FIG. 26).

In the concave-convex pattern 8C, convex portions 9C which protrude toward the front side and extend in the horizontal direction, which is the second direction, are continuously formed in the vertical direction, which is the first direction. The concave-convex pattern 8C has a function of guiding the light toward the reflection member 4 by inward reflecting the light exiting from the light source units 7 and incident on the light guiding member 5.

In the convex portions 9C, the outer shape of the cross section parallel to the light-incident surface 5b is formed as, for example, a parabolic shape. That is, as in the convex portion 9, the convex portion 9C satisfies the equation of "$Y=-X^2/4a+a$."

In the concave-convex pattern 8C, the value of the angle range θ decreases, as the value of the incident angle φ increases in the range of $0<\phi<\tan^{-1}$ (L/t) up to a distance L2 in the second direction from the light-incident surfaces 5b of the light guiding member 5. Further, the angle range θ covers both of the positive range and the negative range.

Further, in the concave-convex pattern 8C, the value of the angle range θ decreases, as the value of the incident angle φ increases in the range of $0<\phi<\tan^{-1}$ (L/t) distant from a distance L2 in the second direction from the light-incident surfaces 5b of the light guiding member 5. Further, the angle range θ covers only the negative range when.

In this case, a relation of $L2>L/[\tan\{\sin^{-1}(1/n)\}]$ is satisfied on the assumption that L is the distance between the central points of the light-emitting elements 11 and n is the refractive index of the light guiding member 5.

For example, the distance L2 is 50 mm. The convex portions 9C have the same shape as that of the convex portions 9 in the range up to the distance L2 from the light-incident surfaces 5b, whereas the convex portions 9C have, for example, the same shape as that of the concave-convex pattern 50B or the concave-convex pattern 50D in the range distant from the distance L2.

As described above, the convex portion 9C satisfies the equation of "$Y=-X^2/4a+a$." Therefore, all of the light passing through a focus V of the convex portion 9C and reflected inward from the convex portion 9C travel in the thickness direction of the light guiding member 5.

Comparison Data

Hereinafter, data obtained by measuring the concave-convex patterns 8, 8A, 8B, and 8C and measuring the shape 50A and the concave-convex patterns 50B, 50C, and 50D according to the comparison examples will be described (see FIGS. 27 to 35).

Figure 27:
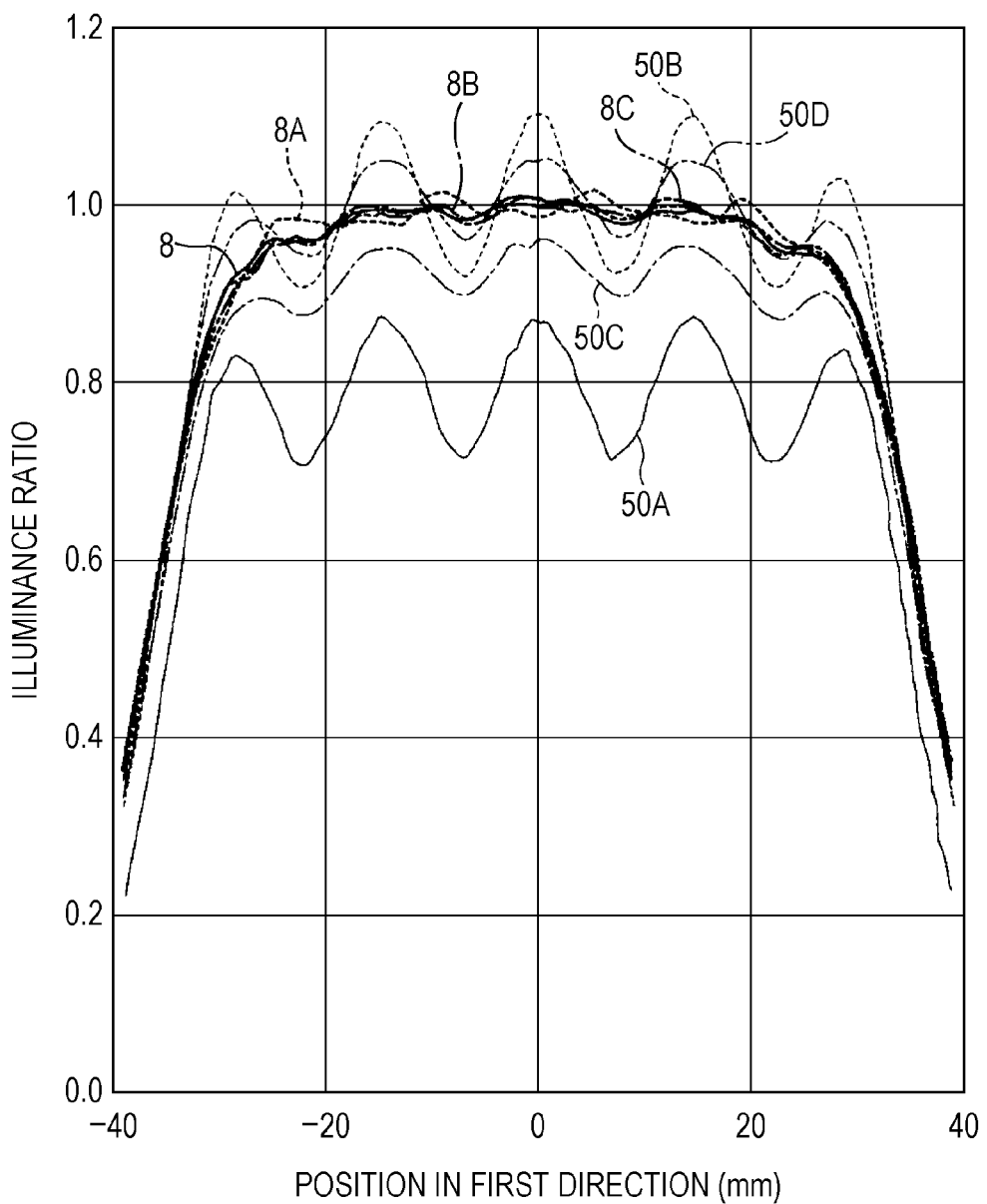
FIG. 27 is a graph illustrating data obtained by measuring illuminance at a position at which a distance is 10.5 mm from a light-incident surface of the light guiding member in a second direction.

FIG. 27 is a graph illustrating the data obtained by measuring illuminance at a position at which a distance is 10.5 mm from the light-incident surface 5b of the light guiding member 5 in the second direction. The measurement of the data in FIG. 27 is carried out when an interval L is assumed to be 14.64 mm and the light is emitted from five light-emitting elements 11 spaced in the first direction.

The horizontal axis represents a position in the first direction with reference to the light-emitting element and a light-emitting point of the third light-emitting element 11 among the five light-emitting elements 11 is assumed to be "0." The vertical axis represents an illuminance ratio. The illuminance at the position 0 in the concave-convex pattern 8 is assumed to be reference illuminance "1."

As shown in FIG. 27, it can be understood that the unevenness of luminance rarely occurs in the concave-convex patterns 8, 8A, 8B, and 8C, whereas a difference between the maximum value and the minimum value of the shape 50A and the concave-convex patterns 50B, 50C, and 50D is large and the large unevenness of the luminance occurs.

Figure 28:
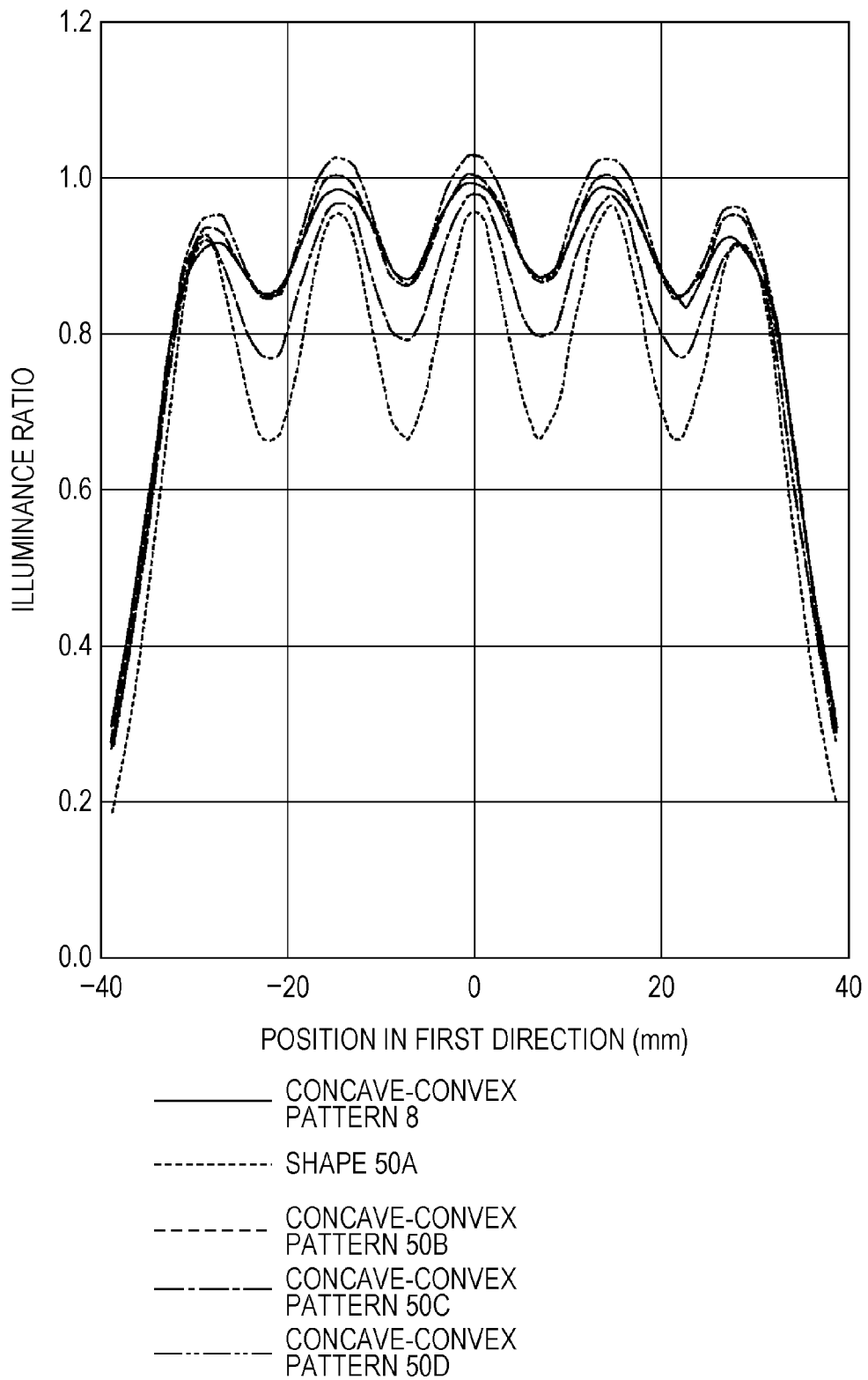
FIG. 28 is a graph illustrating data obtained by measuring illuminance at a position at which a distance is 8.5 mm from the light-incident surface of the light guiding member in the second direction.

FIG. 28 is a graph illustrating the data obtained by measuring illuminance at a position at which a distance is 8.5 mm from the light-incident surface 5b of the light guiding member 5 in the second direction. The measurement of the data in FIG. 28 is carried out when the interval L is assumed to be 14.64 mm and the light is emitted from five light-emitting elements 11 spaced in the first direction, as in the measurement of FIG. 27.

The horizontal axis represents a position in the first direction with reference to the light-emitting element 11 and the light-emitting point of the third light-emitting element 11 among the five light-emitting elements 11 is assumed to be "0." The vertical axis represents an illuminance ratio. The illuminance at the position 0 in the concave-convex pattern 8 is assumed to be reference illuminance "1."

For example, FIG. 28 shows the data obtained by measuring the concave-convex pattern 8 and measuring the shape 50A and the concave-convex patterns 50B, 50C, and 50D according to the comparative examples.

As shown in FIG. 28, it can be understood that a difference between the maximum value and the minimum value of the concave-convex pattern 8 is small and the unevenness of the luminance is small, whereas the difference between the maximum value and the minimum value of the shape 50A and the concave-convex patterns 50B, 50C, and 50D is large and the large unevenness of the luminance occurs. In particular, the unevenness of the luminance is large in the shape 50A and the concave-convex pattern 50C.

Figure 29:
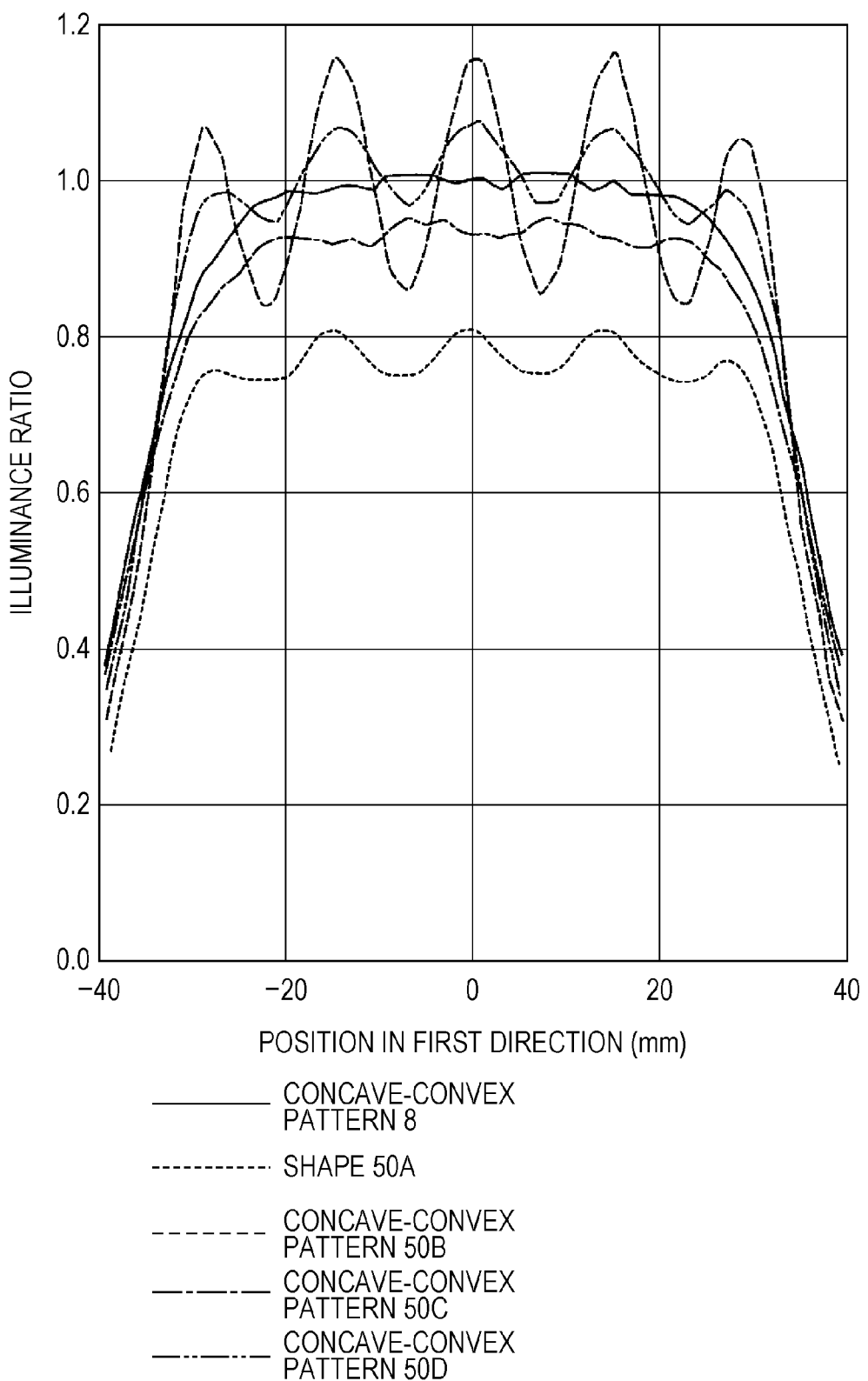
FIG. 29 is a graph illustrating data obtained by measuring illuminance at a position at which a distance is 12.5 mm from the light-incident surface of the light guiding member in the second direction.

FIG. 29 is a graph illustrating the data obtained by measuring illuminance at a position at which a distance is 12.5 mm from the light-incident surface 5b of the light guiding member 5 in the second direction. The measurement of the data in FIG. 29 is carried out when the interval L is assumed to be 14.64 mm and the light is emitted from five light-emitting elements 11 spaced in the first direction, as in the measurements of FIGS. 27 and 28.

The horizontal axis represents a position in the first direction with reference to the light-emitting element 11 and the light-emitting point of the third light-emitting element 11 among the five light-emitting elements 11 is assumed to be "0." The vertical axis represents an illuminance ratio. The illuminance at the position 0 in the concave-convex pattern 8 is assumed to be reference illuminance "1."

For example, FIG. 29 shows the data obtained by measuring the concave-convex pattern 8 and measuring the shape 50A and the concave-convex patterns 50B, 50C, and 50D according to the comparison examples.

As shown in FIG. 29, it can be understood that the unevenness of luminance rarely occurs in the concave-convex pattern 8, whereas a difference between the maximum value and the minimum value of the shape 50A and the concave-convex patterns 50B, and 50D is large and the large unevenness of the luminance occurs.

Figure 30:
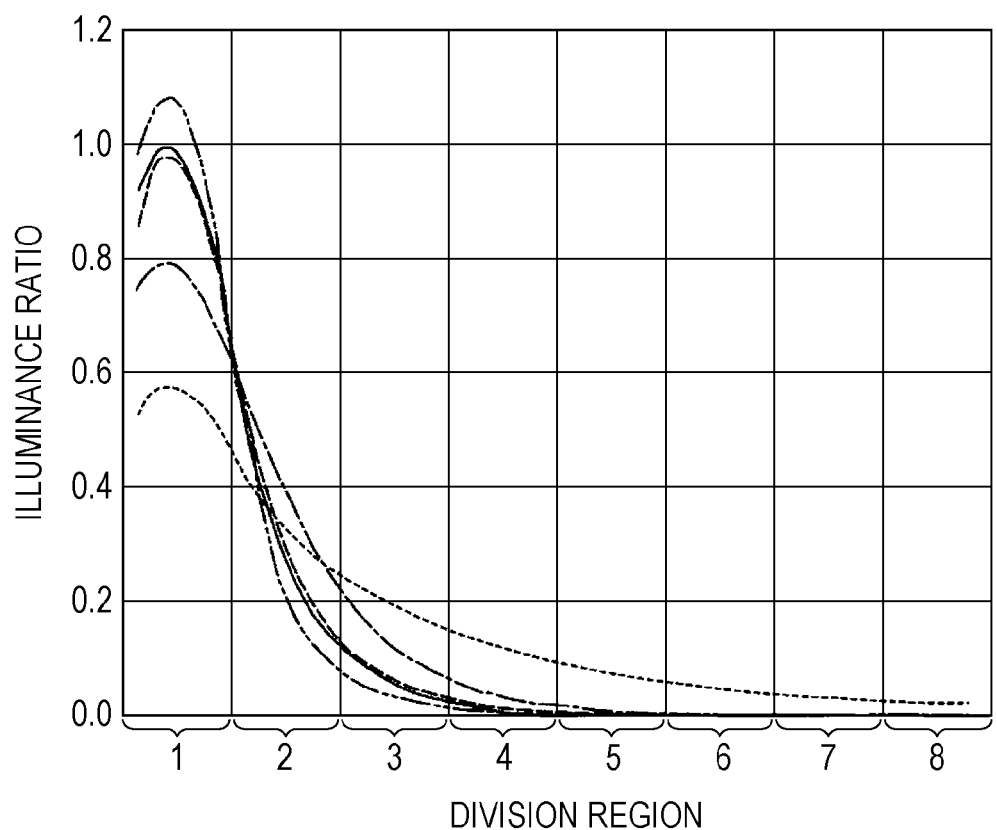
FIG. 30 is graph illustrating data obtained by measuring illuminance of all division regions when light is emitted from the light-emitting elements located so as to correspond to one division region in the light guiding member.

FIG. 30 is graph illustrating data obtained by measuring illuminance of the division region 1 to the division region 8 when light is emitted from the light-emitting elements 11 of the light source units 7 located so as to correspond to the division region 1 in the light guiding member 5. The horizontal axis represents the division regions and the vertical axis represents an illumination ratio. The maximum illumination in the division region 1 of the concave-convex pattern 8 is assumed to be reference illuminance "1."

Figure 31:
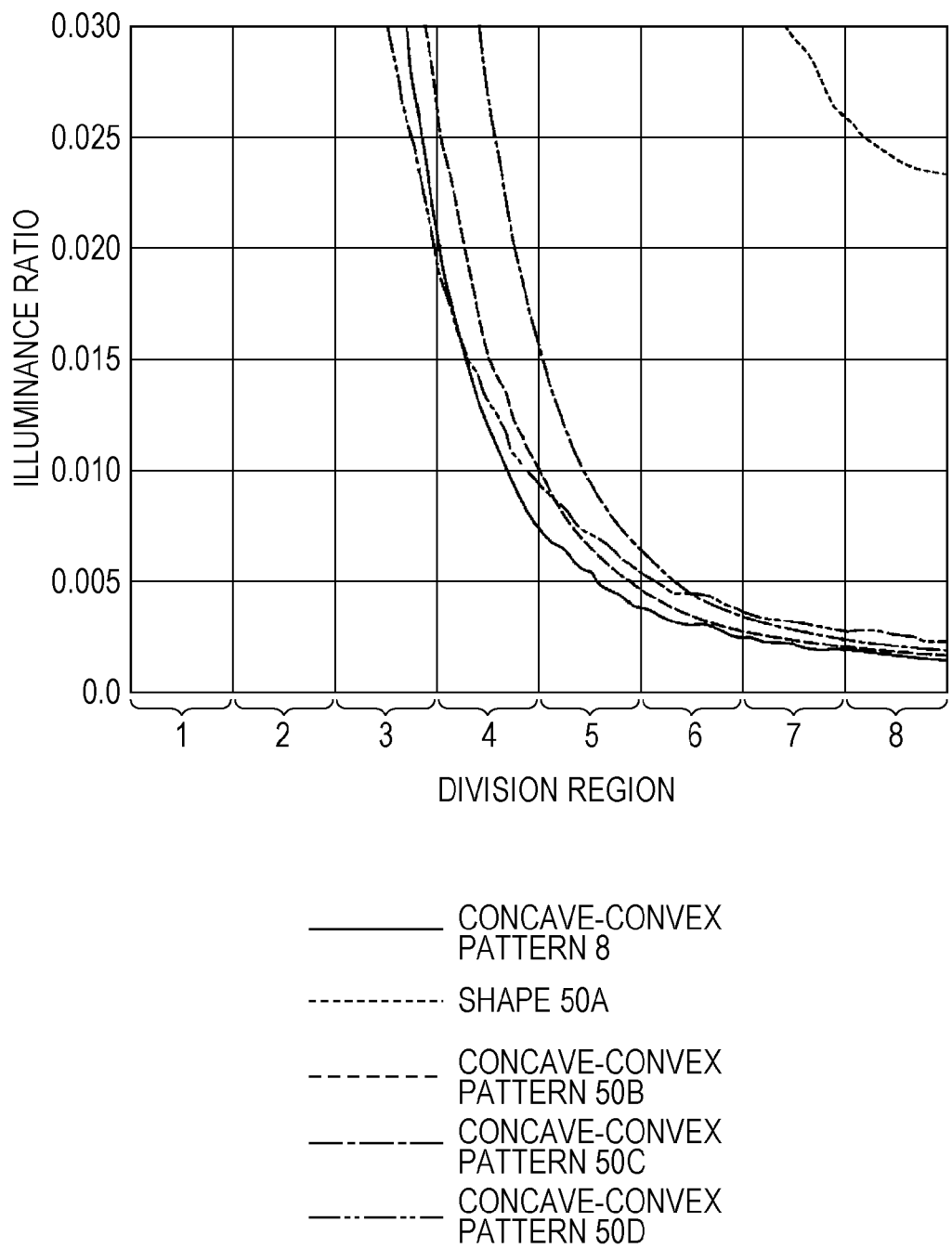
FIG. 31 is a graph expanding a low portion of an illuminance ratio in the graph of FIG. 30.

FIG. 31 is a graph expanding a low portion of an illuminance ratio in the graph of FIG. 30.

For example, FIGS. 30 and 31 show the data obtained by measuring the concave-convex pattern 8 and measuring the shape 50A and the concave-convex patterns 50B, 50C, and 50D according to the comparison examples.

As shown in FIGS. 30 and 31, it can be understood that the amount of leakage light is small in the regions other than the division region 1 in the concave-convex pattern 8, whereas the amount of leakage light is large in the regions other than the division region 1 in the shape 50A and the concave-convex pattern 50C.

Figure 32:
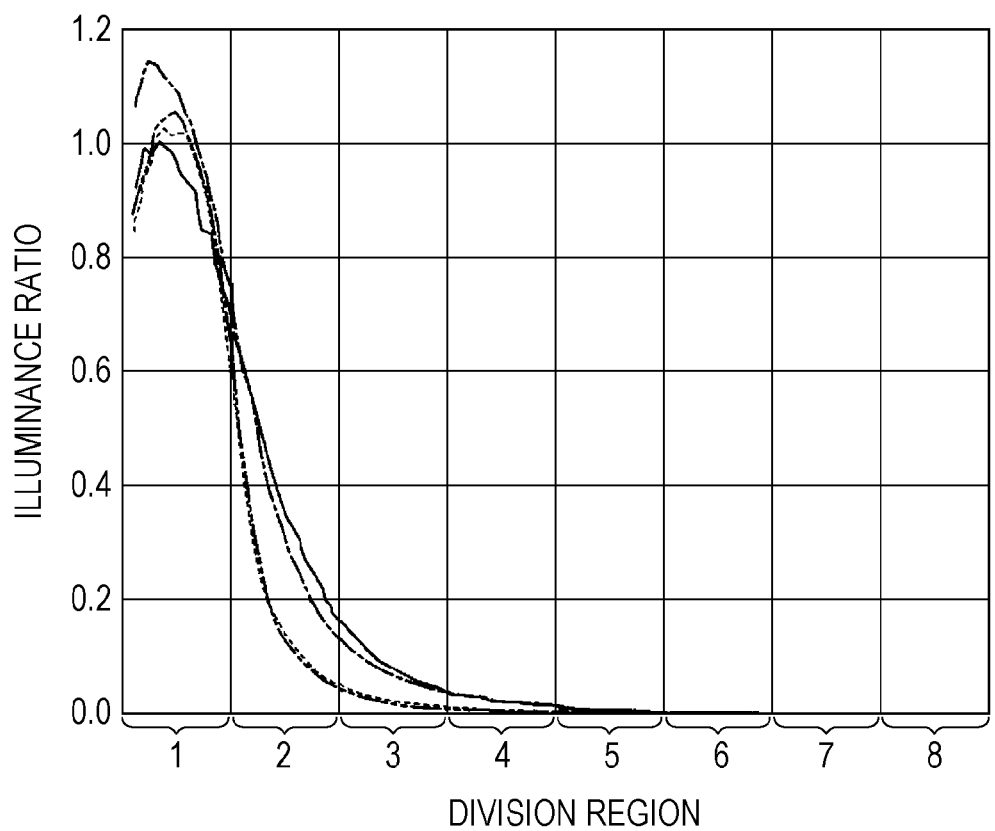
FIG. 32 is graph illustrating data obtained by measuring illuminance of all division regions when light is emitted from the light-emitting element located so as to correspond to one division region in the light guiding member.

FIG. 32 is graph illustrating data obtained by measuring illuminance of the division region 1 to the division region 8 when light is emitted from the light-emitting elements 11 of the light source units 7 located so as to correspond to the division region 1 in the light guiding member 5.

For example, FIG. 32 shows the data obtained by measuring the concave-convex patterns 8 and 8C at the middle position of the light guiding member 5 and the position near the light-incident surface 5b in the second direction. The horizontal axis represents the division regions and the vertical axis represents an illumination ratio. The maximum illumination in the division region 1 of the concave-convex pattern 8 is assumed to be reference illuminance "1."

As shown in FIG. 32, it can be understood that a difference between the illumination at the middle position of the light guiding member 5 and the illumination at the position near the light-incident surface 5b is smaller in the concave-convex pattern 8C than in the concave-convex pattern 8.

Figure 33:
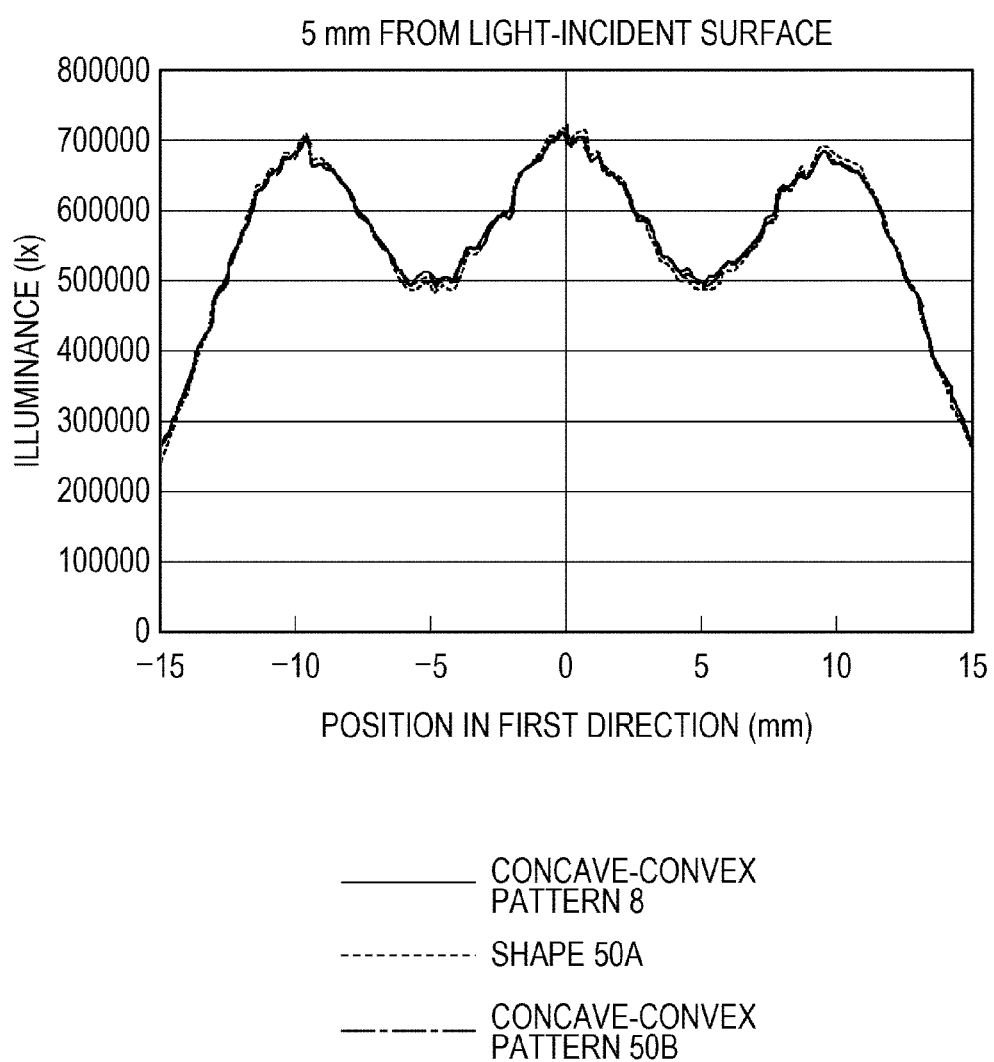
FIG. 33 is a graph illustrating data obtained by measuring illuminance at a position at which a distance is 5 mm from the light-incident surface of the light guiding member in the second direction.
Figure 34:
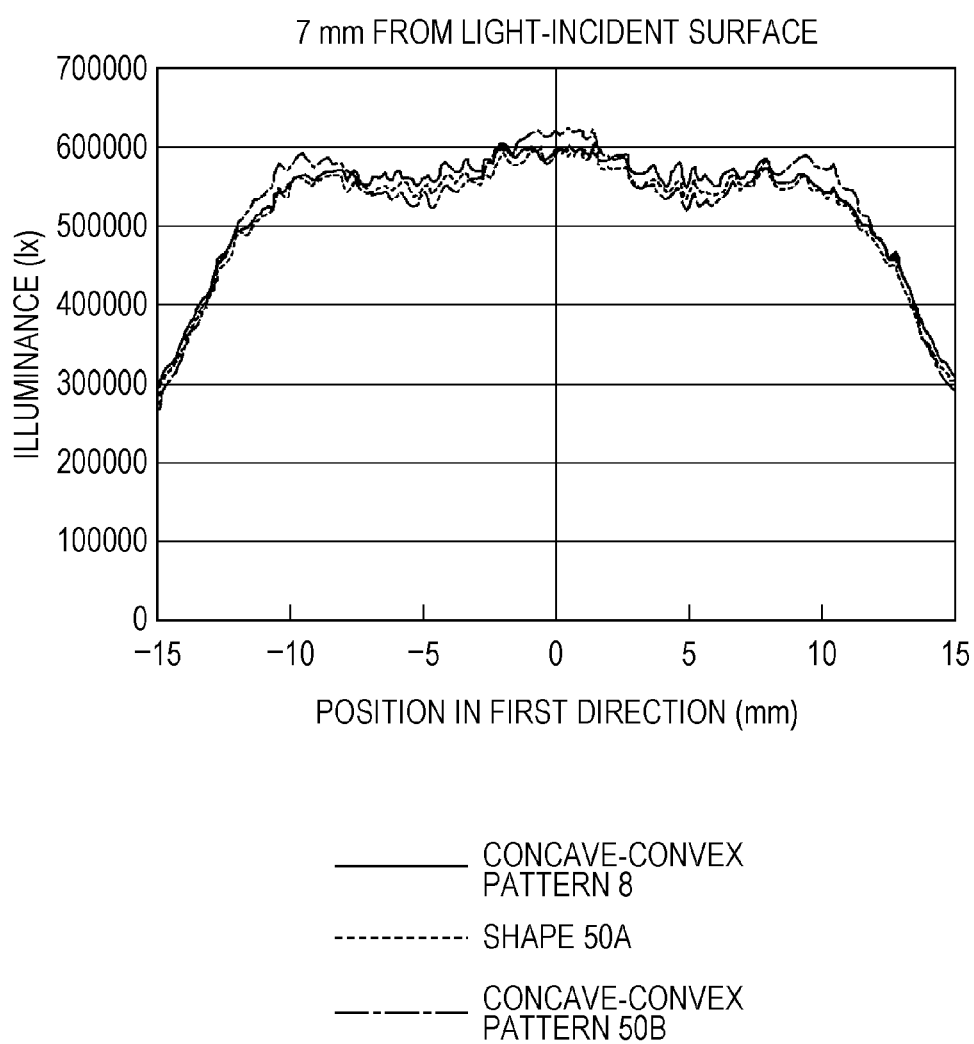
FIG. 34 is a graph illustrating data obtained by measuring illuminance at a position at which a distance is 7 mm from the light-incident surface of the light guiding member in the second direction.
Figure 35:
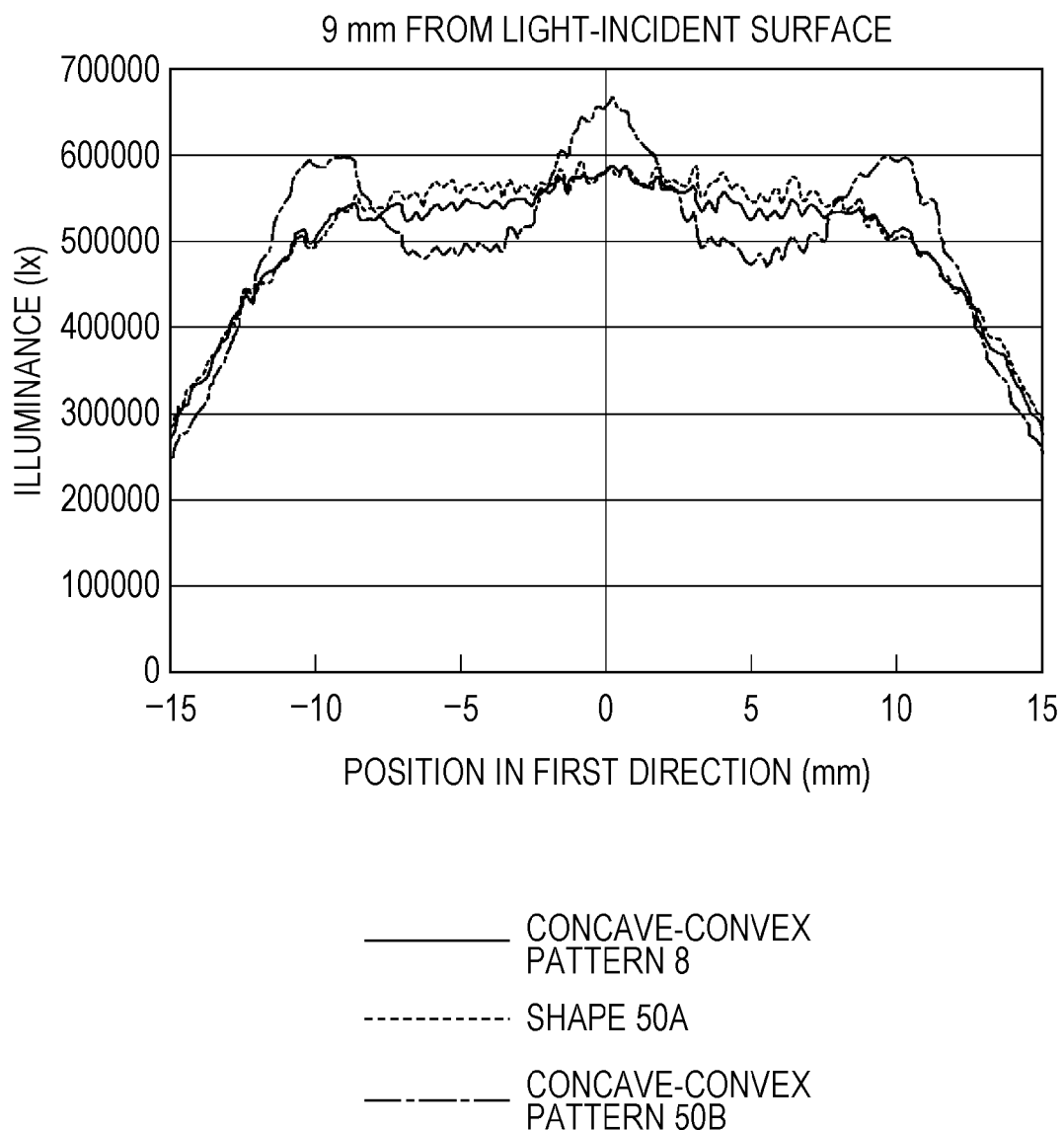
FIG. 35 is a graph illustrating data obtained by measuring illuminance at a position at which a distance is 9 mm from the light-incident surface of the light guiding member in the second direction.

FIG. 33 is a graph illustrating data obtained by measuring illuminance at a position at which a distance is 5 mm from the light-incident surface 5b of the light guiding member 5 in the second direction. FIG. 34 is a graph illustrating data obtained by measuring illuminance at a position at which a distance is 7 mm from the light-incident surface 5b of the light guiding member 5 in the second direction. FIG. 35 is a graph illustrating data obtained by measuring illuminance at a position at which a distance is 9 mm from the light-incident surface 5b of the light guiding member 5 in the second direction.

For example, FIGS. 33 to 35 show the data obtained by measuring the concave-convex pattern 8 and measuring the shape 50A and the concave-convex pattern 50B according to the comparison examples. The measurements of the data in FIGS. 33 to 35 are carried out when the light is emitted from five light-emitting elements 11 spaced in the first direction.

The horizontal axis represents a position in the first direction with reference to the light-emitting element and a light-emitting point of the third light-emitting element 11 among the five light-emitting elements 11 is assumed to be "0." The vertical axis represents illuminance.

As shown in FIGS. 33 to 35, the unevenness of the luminance is considerably reduced as the distance from the light-incident surface 5b increases in the concave-convex pattern 8. However, the unevenness of the luminance tends to easily occur, although the distance from the light-incident surface 5b increases in the concave-convex pattern 50B. In particular, in the concave-convex pattern 50B, the large unevenness of the luminance occurs, although the distance from the light-incident surface 5b increases.

Conclusion

In the light-emitting device 3, as described above, the value of the angle range θ decreases, as the value of the incident angle φ increases in the range of 0<φ<$\tan^{-1}$ (L/t). Further, the angle range θ covers both of the positive range and the negative range.

In the light guiding member 5, the value of the incident angle φ decreases in the region near the light-emitting element 11. Therefore, the value of the angle range θ decreases, as the value of the incident angle φ increases. Accordingly, strong light can be reflected toward a broad area in the first direction, which includes the portions between the light-emitting elements 11 in the light guiding member 5 and which it is difficult for light to reach. Further, the value of the incident angle φ is large in the regions between the light-emitting elements 11 in the light guiding member 5. Therefore, the value of the angle range θ decreases, as the value of the incident angle φ increases. Accordingly, weak light can be efficiently reflected toward the portions between the light-emitting elements 11 in the light guiding member 5.

On the other hand, when the angle range θ covers only the positive range, the leakage light increases in the other division regions. When the angle range θ covers only the negative range, the leakage light is reduced in the other division regions. However, it is difficult for light to reach the regions between the light-emitting elements 11 near the light-incident surface 5b of the light guiding member 5.

Accordingly, the light-emitting device is configured such that the value of the angle range θ decreases as the value of the incident angle φ increases in the range of 0<φ<$\tan^{-1}$ (L/t), and the angle range θ covers both of the positive range and the negative range. With such a configuration, the unevenness of the luminance in the light guiding member 5 is reduced to improve the uniformity of the luminance and the leakage light in the other division regions can be reduced.

Since the outer shape of the convex portions 9 and 9C is formed so as to satisfy the equation of "Y=$-X^2$/4a+a", the light passing through the focus V of the convex portions 9 and 9C and reflected inward travels in the thickness direction of the light guiding member 5.

Accordingly, the unevenness of the luminance is further reduced and the leakage light in the other division regions is further reduced.

Further, in the concave-convex pattern 8C, the value of the angle range θ decreases as the value of the incident angle φ increases in the range of 0<φ<$\tan^{-1}$ (L/t) in the range up to the distance L2 in the second direction from the light-incident surfaces 5b and the angle range θ covers both of the positive and negative ranges. Furthermore, the value of the angle range θ decreases as the value of the incident angle φ increases in the range of 0<φ<$\tan^{-1}$ (L/t) in the range distant from the distance L2 in the second direction from the light-incident surfaces 5b of the light guiding member 5 and the angle range θ covers only the negative range in the case of.

In this case, L2>L/[ tan { $\sin^{-1}$(1/n)}] on the assumption that L is the distance between the central points of the light-emitting elements 11 and n is the refractive index of the light guiding member 5.

Accordingly, even when the shape of the concave-convex pattern is changed, the unevenness of the luminance is reduced in the light guiding member 5 and the uniformity of the luminance is improved. Further, the leakage light in the other division regions is reduced. Furthermore, the degree of freedom is improved in the design of the concave-convex pattern.

It should be understood by those skilled in the art that various modifications, combinations, sub-combinations and alterations may occur depending on design requirements and other factors insofar as they are within the scope of the appended claims or the equivalents thereof.

What is claimed is:

1. A device comprising:
   a plate-shaped light guiding member of which one surface in a thickness direction of the light guiding member is formed as a light reflection and exit surface reflecting light inward and exiting the light and of which at least one side surface in a direction perpendicular to the thickness direction is formed as a light-incident surface on which the light is incident; and
   a reflection member which is disposed so as to face an opposite surface of the light reflection and exit surface of the light guiding member and which reflects the light reflected inward from the light reflection and exit surface and passing through the light guiding member and makes the light incident from the opposite surface of the light guiding member,
   wherein the light reflection and exit surface of the light guiding member has a concave-convex pattern including a plurality of convex portions which are formed in a first direction perpendicular to the thickness direction on the light reflection and exit surface of the light guiding member, extends in a second direction perpendicular to the thickness direction and the first direction, and reflects the light emitted from the light-emitting elements inward, and
   wherein, when a plurality of light-emitting elements are disposed on the at least one light-incident surface of the light guiding member spaced in the first direction, if L is a distance between the light-emitting elements, t is a thickness of the light guiding member, an incident angle φ of the light on the light reflection and exit surface is an angle between a line segment, which is obtained by projecting a light path from the light-emitting element to the light reflection and exit surface on a surface parallel to the light-incident surface, and a line segment, which extends from a central point of the light-emitting element to the light reflection and exit surface in the thickness direction, θ is a maximum angle range of reflected light when light incident at the incident angle φ is reflected inward from the light reflection and exit surface, and ranges close to and distant from the light-emitting element emitting the light with respect to a line segment extending in the thickness direction in the angle range θ are negative and positive ranges, respectively, a value of the angle range θ decreases as a value of the incident angle φ increases in a range of 0<φ<$\tan^{-1}$ (L/t) and the angle range θ covers both of the positive and negative ranges.

2. The device according to claim 1, wherein on condition that, in a cross-sectional shape parallel to the light-incident surface, an X axis is a line segment binding both ends of a respective convex portion in the first direction, a Y axis is a line segment passing through a central point of the both ends of the convex portion and extending in the thickness direction, and a is a maximum height of the convex portion, an outer shape of the convex portion satisfies an equation of Y=$-X^2$/4a+a.

3. A device comprising:
   a plate-shaped light guiding member of which one surface in a thickness direction of the light guiding member is formed as a light reflection and exit surface reflecting light inward and exiting the light and of which at least one side surface in a direction perpendicular to the thickness direction is formed as a light-incident surface on which the light is incident; and
   a reflection member which is disposed so as to face an opposite surface of the light reflection and exit surface of the light guiding member and which reflects the light reflected inward from the light reflection and exit surface and passing through the light guiding member and makes the light incident from the opposite surface of the light guiding member, wherein the light reflection and exit surface of the light guiding member has a concave-convex pattern including a plurality of convex portions which are formed in a first direction perpendicular to the thickness direction on the light reflection and exit surface of the light guiding member, extends in a second direction perpendicular to the thickness direction and the first direction, and reflects the light emitted from the light-emitting elements inward, and wherein, when a plurality of light-emitting elements are disposed on the at least one light-incident surface of the light guiding member spaced in the first direction, if L is a distance between the light-emitting elements, t is a thickness of the light guiding member, an incident angle φ of the light on the light reflection and exit surface is an angle between a line segment, which is obtained by projecting a light path from the light-emitting element to the light reflection and exit surface on a surface parallel to the light-incident surface, and a line segment, which extends from a central point of the light-emitting element to the light reflection and exit surface in the thickness direction, θ is a maximum angle range of reflected light when light incident at the incident angle φ is reflected inward from the light reflection and exit surface, and ranges close to and distant from the light-emitting element emitting the light with respect to a line segment extending in the thickness direction in the angle range θ are negative and positive ranges, respectively, a value of the angle range θ decreases as a value of the incident angle φ increases in a range of $0<\phi<\tan^{-1}(L/t)$ in a range up to a distance L2 in the second direction from the at least one side surface of the light guiding member and the angle range θ covers both of the positive and negative ranges, whereas the value of the angle range θ decreases as the value of the incident angle φ increases in the range of $0<\phi<\tan^{-1}(L/t)$ in a range distant from the distance L2 in the second direction from the at least one side surface of the light guiding member and the angle range θ covers only the negative range in a case of $\phi=\tan^{-1}(L/t)$, where $L2>L/[\tan\{\sin^{-1}(1/n)\}]$ in which n is a refractive index of the light guiding member.

4. The device according to claim 3, wherein on condition that, in a cross-sectional shape parallel to the light-incident surface, an X axis is a line segment binding both ends of a respective convex portion in the first direction, a Y axis is a line segment passing through a central point of the both ends of the convex portion and extending in the thickness direction, and a is a maximum height of the convex portion, an outer shape of the convex portion satisfies an equation of $Y=-X^2/4a+a$.

5. An apparatus comprising:
a display panel which displays an image;
a plate-shaped light guiding member which is disposed opposite to a display surface of the display panel, of which one surface in a thickness direction of the light guiding member is formed as a light reflection and exit surface reflecting light inward and exiting the light, and of which at least one side surface in a direction perpendicular to the thickness direction is formed as a light-incident surface on which the light is incident; and
a reflection member which is disposed so as to face an opposite surface of the light reflection and exit surface of the light guiding member and which reflects the light reflected inward from the light reflection and exit surface and passing through the light guiding member and makes the light incident from the opposite surface of the light guiding member, wherein the light reflection and exit surface of the light guiding member has a concave-convex pattern including a plurality of convex portions which are formed in a first direction perpendicular to the thickness direction on the light reflection and exit surface of the light guiding member, extends in a second direction perpendicular to the thickness direction and the first direction, and reflects the light emitted from the light-emitting elements inward, and wherein, when a plurality of light-emitting elements are disposed on the at least one light-incident surface of the light guiding member spaced in the first direction, if L is a distance between the light-emitting elements, t is a thickness of the light guiding member, an incident angle φ of the light on the light reflection and exit surface is an angle between a line segment, which is obtained by projecting a light path from the light-emitting element to the light reflection and exit surface on a surface parallel to the light-incident surface, and a line segment, which extends from a central point of the light-emitting element to the light reflection and exit surface in the thickness direction, θ is a maximum angle range of reflected light when light incident at the incident angle φ is reflected inward from the light reflection and exit surface, and ranges close to and distant from the light-emitting element emitting the light with respect to a line segment extending in the thickness direction in the angle range θ are negative and positive ranges, respectively, a value of the angle range θ decreases as a value of the incident angle φ increases in a range of $0<\phi<\tan^{-1}(L/t)$ and the angle range θ covers both of the positive and negative ranges.

6. An apparatus comprising:
a display panel which displays an image;
a plate-shaped light guiding member which is disposed opposite to a display surface of the display panel, of which one surface in a thickness direction of the light guiding member is formed as a light reflection and exit surface reflecting light inward and exiting the light, and of which at least one side surface in a direction perpendicular to the thickness direction is formed as a light-incident surface on which the light is incident; and
a reflection member which is disposed so as to face an opposite surface of the light reflection and exit surface of the light guiding member and which reflects the light reflected inward from the light reflection and exit surface and passing through the light guiding member and makes the light incident from the opposite surface of the light guiding member, wherein the light reflection and exit surface of the light guiding member has a concave-convex pattern including a plurality of convex portions which are formed in a first direction perpendicular to the thickness direction on the light reflection and exit surface of the light guiding member, extends in a second direction perpendicular to the thickness direction and the first direction, and reflects the light emitted from the light-emitting elements inward, and wherein, when a plurality of light-emitting elements are disposed on the at least one light-incident surface of the light guiding member spaced in the first direction, if L is a distance between the light-emitting elements, t is a thickness of the light guiding member, an incident angle $\phi$ of the light on the light reflection and exit surface is an angle between a line segment, which is obtained by projecting a light path from the light-emitting element to the light reflection and exit surface on a surface parallel to the light-incident surface, and a line segment, which extends from a central point of the light-emitting element to the light reflection and exit surface in the thickness direction, $\theta$ is a maximum angle range of reflected light when light incident at the incident angle $\phi$ is reflected inward from the light reflection and exit surface, and ranges close to and distant from the light-emitting element emitting the light with respect to a line segment extending in the thickness direction in the angle range $\theta$ are negative and positive ranges, respectively, a value of the angle range $\theta$ decreases as a value of the incident angle $\phi$ increases in a range of $0<\phi<\tan^{-1}(L/t)$ in a range up to a distance L2 in the second direction from the at least one side surface of the light guiding member and the angle range $\theta$ covers both of the positive and negative ranges, whereas the value of the angle range $\theta$ decreases as the value of the incident angle $\phi$ increases in the range of $0<\phi<\tan^{-1}(L/t)$ in a range distant from the distance L2 in the second direction from the at least one side surface of the light guiding member and the angle range $\theta$ covers only the negative range in a case of $\phi=\tan^{-1}(L/t)$, where $L2>L/[\tan\{\sin^{-1}(1/n)\}]$ in which n is a refractive index of the light guiding member.

\* \* \* \* \*